(12) United States Patent
Takahashi

(10) Patent No.: US 6,556,367 B2
(45) Date of Patent: Apr. 29, 2003

(54) STORAGE APPARATUS AND POSITION SENSITIVITY SETTING METHOD

(75) Inventor: Eisaku Takahashi, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/751,096

(22) Filed: Dec. 28, 2000

(65) Prior Publication Data

US 2001/0001585 A1 May 24, 2001

Related U.S. Application Data

(63) Continuation of application No. PCT/JP99/03365, filed on Jun. 24, 1999.

(30) Foreign Application Priority Data

Jul. 10, 1998 (JP) ............................................ 10-195618

(51) Int. Cl.$^7$ ................................................. G11B 5/02
(52) U.S. Cl. ................... 360/67; 360/77.04; 360/77.08; 360/78.14
(58) Field of Search ............................... 360/77.08, 67, 360/78.14, 77.05, 77.04, 78.04

(56) References Cited

U.S. PATENT DOCUMENTS

| 5,521,771 A | | 5/1996 | Keithley et al. | |
| 5,541,785 A | * | 7/1996 | Sasamoto et al. | 360/77.05 |
| 5,822,144 A | | 10/1998 | Takahashi | |
| 5,946,158 A | * | 8/1999 | Nazarian et al. | 360/77.04 |
| 5,978,167 A | * | 11/1999 | Abe | 360/77.04 |
| 5,982,173 A | * | 11/1999 | Hagen | 324/212 |
| 6,046,879 A | * | 4/2000 | Hampshire | 360/77.08 |
| 6,118,615 A | * | 9/2000 | Takaishi | 360/77.02 |
| 6,369,974 B1 | * | 4/2002 | Asgari et al. | 360/78.14 |

FOREIGN PATENT DOCUMENTS

| DE | 19548525 A1 | 10/1996 |
| DE | 19548525 C2 | 10/1996 |
| JP | 05210926 A | 8/1993 |
| JP | 08195044 A | 7/1996 |
| JP | 08249842 A | 9/1996 |
| JP | 8-293175 | 11/1996 |
| JP | 09081921 A | 3/1997 |
| JP | 09128916 A | 5/1997 |
| JP | 9-198817 | 7/1997 |

* cited by examiner

Primary Examiner—David Hudspeth
Assistant Examiner—Dan I. Davidson
(74) Attorney, Agent, or Firm—Greer, Burns & Crain, Ltd.

(57) ABSTRACT

High-accuracy position signals are obtained by correcting nonlinear position sensitivities of two phase signals demodulated from two-phase servo information, into linear ones. A position sensitivity adjusting unit detects the signal level at the intersection of position signals N and Q having different phases by a predetermined track pitch which are demodulated from read signals of two-phase servo information buried and recorded in a disk medium and makes an adjustment of the gain of an AGC amplifier so that the intersection signal level coincides with a predetermined level. A sensitivity correcting unit corrects into linear position sensitivities the nonlinear position sensitivities approximated by sine functions or cosine functions relative to the actual track position X of the two position signals N and Q output from the AGC amplifier.

9 Claims, 27 Drawing Sheets

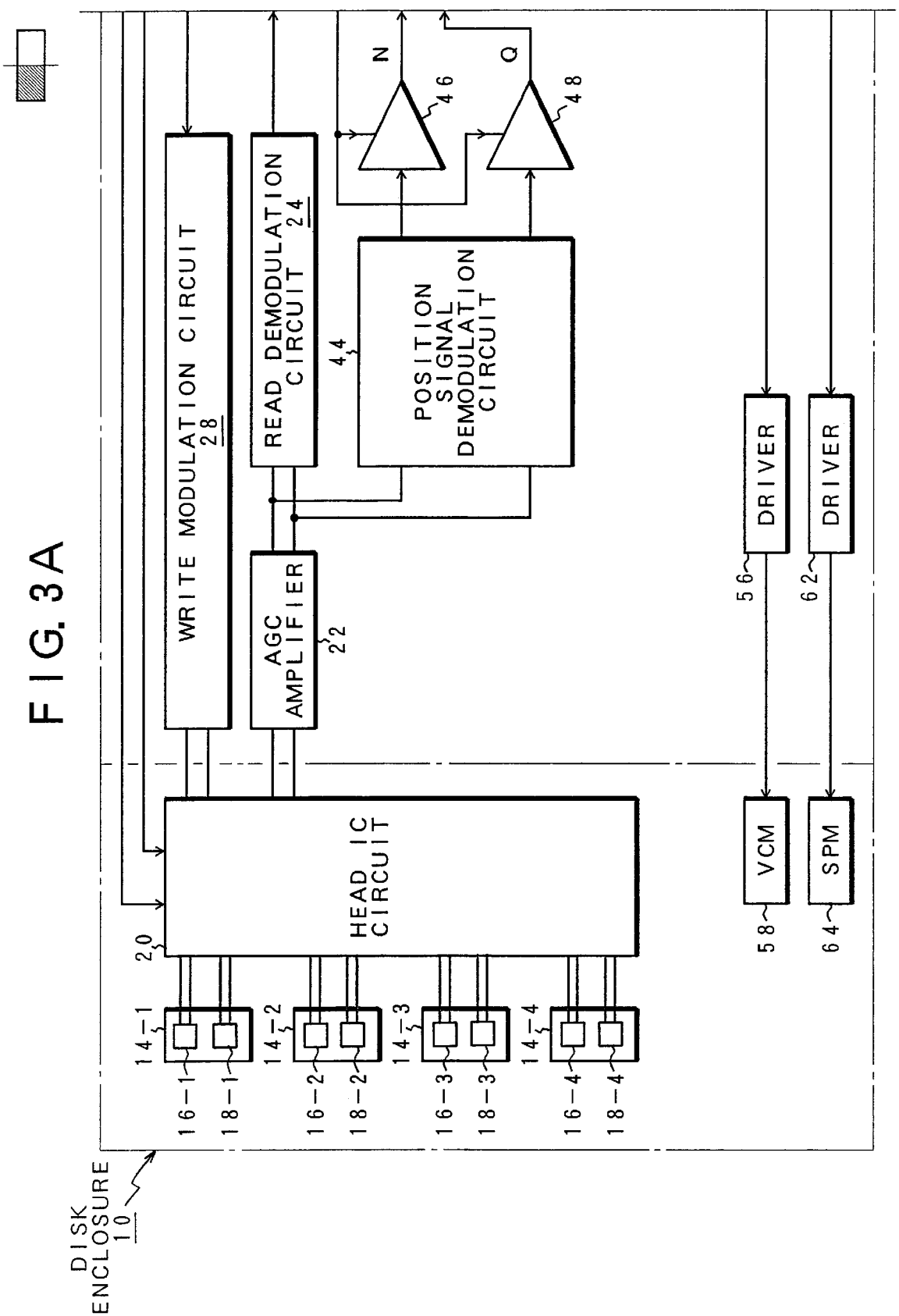

FIG. 10

| PosN,Q | PRODUCT COEFFICIENT |
|---|---|
| 0.00 | 0.7000000 |
| 0.01 | 0.7000960 |
| 0.02 | 0.7005431 |
| 0.03 | 0.7014965 |
| 0.04 | 0.7030720 |
| 0.05 | 0.7053666 |
| 0.06 | 0.7084654 |
| 0.07 | 0.7124456 |
| 0.08 | 0.7173779 |
| 0.09 | 0.7233280 |
| 0.10 | 0.7303579 |
| 0.11 | 0.7385259 |
| 0.12 | 0.7478877 |
| 0.13 | 0.7584965 |
| 0.14 | 0.7704030 |
| 0.15 | 0.7836564 |
| 0.16 | 0.7983040 |
| 0.17 | 0.8143914 |
| 0.18 | 0.8319631 |
| 0.19 | 0.8510620 |
| 0.20 | 0.8717300 |
| 0.21 | 0.8940079 |
| 0.22 | 0.9179355 |
| 0.23 | 0.9435515 |
| 0.24 | 0.9708940 |
| 0.25 | 1.0000000 |

FIG. 11A

| TRACK RANGE | N-POLARITY | Q-POLARITY | N SIGNAL TABLE LOOKUP VALUE | Q SIGNAL TABLE LOOKUP VALUE |
|---|---|---|---|---|
| 0.00TP<N, Q≦0.25TP | + | − | N | Q+0.5 |
| 0.75TP<N, Q≦1.00TP | + | + | 1−N | 1−(Q+0.5) |
| 1.00TP<N, Q≦1.25TP | − | + | 1+N | 1+(Q+0.5) |
| 1.75TP<N, Q≦2.00TP | − | − | 2−N | 2−(Q+0.5) |

FIG. 11B

| TRACK RANGE | N-POLARITY | Q-POLARITY | N SIGNAL TABLE LOOKUP VALUE | Q SIGNAL TABLE LOOKUP VALUE |
|---|---|---|---|---|
| 0.00TP<N, Q≦0.25TP | + | − | N | Q+0.5 |
| 0.75TP<N, Q≦1.00TP | + | + | 1−N | 0.5−Q |
| 1.00TP<N, Q≦1.25TP | − | + | 1+N | 1.5+Q |
| 1.75TP<N, Q≦2.00TP | − | − | 2−N | 1.5+Q |

F I G. 17
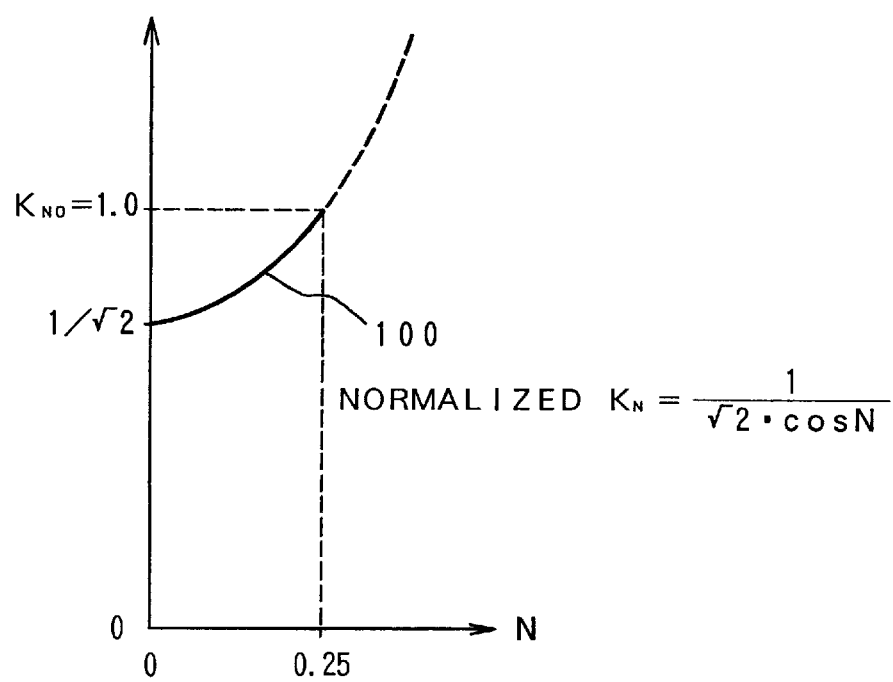
F I G. 18
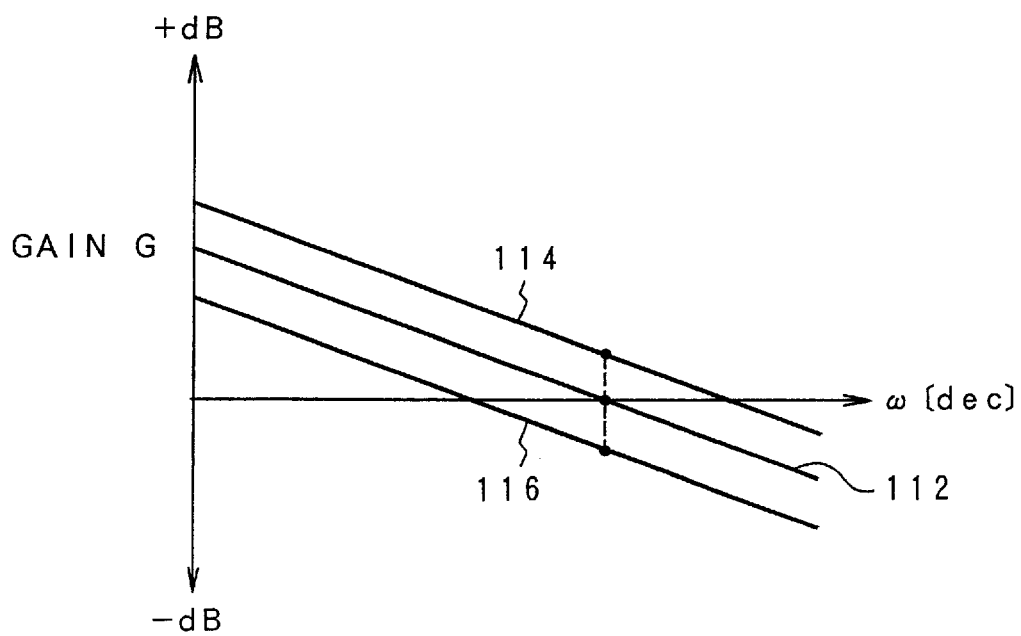

FIG. 23A

| TRACK RANGE | N-POLARITY | Q-POLARITY | N SIGNAL TABLE LOOKUP VALUE | Q SIGNAL TABLE LOOKUP VALUE |
|---|---|---|---|---|
| 0.25TP<N, Q≦0.50TP | + | + | 0.5−N | 0.5−(Q+0.5) |
| 0.50TP<N, Q≦0.75TP | − | + | 0.5+N | 0.5+(Q+0.5) |
| 1.25TP<N, Q≦1.50TP | − | − | 1.5−N | 1.5−(Q+0.5) |
| 1.50TP<N, Q≦1.75TP | + | − | 1.5+N | 1.5+(Q+0.5) |

FIG. 23B

| TRACK RANGE | N-POLARITY | Q-POLARITY | N SIGNAL TABLE LOOKUP VALUE | Q SIGNAL TABLE LOOKUP VALUE |
|---|---|---|---|---|
| 0.25TP<N, Q≦0.50TP | + | + | 0.5−N | −Q |
| 0.50TP<N, Q≦0.75TP | − | + | 0.5+N | 1.0+Q |
| 1.25TP<N, Q≦1.50TP | − | − | 1.5−N | 1.0−Q |
| 1.50TP<N, Q≦1.75TP | + | − | 1.5+N | 2.0+Q |

STORAGE APPARATUS AND POSITION SENSITIVITY SETTING METHOD

This is a continuation of application no. PCT/JP99/03365, filed Jun. 24, 1999.

TECHNICAL FIELD

The present invention relates generally to a storage apparatus and a position sensitivity setting method, ensuring constant position sensitivities by adjusting into a predefined level the intersection level of two position signals demodulated from two-phase servo information buried and recorded in a medium, and more particularly to a storage apparatus and a position sensitivity setting method correcting nonlinear position sensitivities possessed by the position signals into linear ones.

BACKGROUND ART

With the recent demands for larger capacities and smaller dimensions of the magnetic disk units, the track density (TPI) becomes even higher, making improvement of the servo signal based position accuracy for realizing this more significant. As opposed to the conventional servo-surface servo needing dedicated servo surface and servo head, a more cost-effective sector servo, so-called data-surface servo ensuring increased recording capacities has been adopted in which servo information is buried in the data surface at its sector leading position. In case of recording two-phase servo information in the servo-surface servo or sector servo, two position signals N and Q having different phases by 90 degrees (½ track pitch) are demodulated from servo signals read from the disk medium, and on the basis of these position signals N and Q the seeking operations by the head coarse control and the positioning operations by the fine control are carried out. The two position signals N and Q demodulated from the two-phase servo information indicate the head position by their respective signal levels, and therefore, irrespective of any variances in the read signals as a result of dispersions of the core width, the two finally demodulated position signals N and Q must always have unvarying amplitudes at the head position at the intersection level where the two coincide with each other. To this end, upon the apparatus setup for example, a position sensitivity adjustment is carried out which includes moving the head at a low speed, detecting and storing an intersection level where the two position signals N and Q coincide with each other, and setting into an AGC amplifier the gain which has the intersection level as a predefined theoretical value, to thereby keep constant the sensitivities of the two position signals N and Q relative to the head position.

FIG. 1 shows a conventional position sensitivity adjustment circuit directed to the servo-surface servo. Referring to FIG. 1, upon the position sensitivity adjustment, two position signals N and Q having 90-degrees shifted phases are demodulated from the read signal of the two-phase servo information on the servo surface with the VCM being driven at a low speed, and then amplified by AGC amplifiers 102 and 104, after which they are converted into absolute position signals |N| and |Q| by absolute value circuits 106 and 108 for the impartment to an intersection level detection circuit 110.

FIG. 2A shows the position signals N and Q output from the AGC amplifiers 102 and 104 with the axis of abscissas representative of the actual track position X. The position signals N and Q from the AGC amplifiers 102 and 104 are converted into the absolute position signals |N| and |Q| by the absolute value circuits 106 and 108. The intersection level detection circuit 110 compares the absolute value signals |N| and |Q| of FIG. 2B to detect the signal levels at the intersections 114, 116, 118, 120, etc., and stores the average value thereof as the intersection value in a storage 112. The gains of the AGC amplifiers 102 and 104 of FIG. 1 are adjusted such that the intersection value stored in the storage 112 coincides with a certain value (theoretical value). Such a position sensitivity adjustment is carried out for each head and on a disk medium zone basis, and the position signals N and Q are amplified by the AGC amplifiers 102 and 104 so that the intersection level of the position signals N and Q coincides with the certain value (theoretical value) to acquire constantly unvarying position sensitivities. This is the position sensitivity correction or the head core width correction in the state of the art, which allows adjustment for constantly unvarying position sensitivity and high-precision position detection to be made in spite of the core width dispersions on a head-to-head basis.

By the way, a higher medium track density TPI attendant on the increased capacity and reduced dimensions necessitates more precise position sensitivities. However, the position signals N and Q demodulated from the two-phase servo information shown in FIG. 2A are merely ideal signals lacking the consideration for, e.g., the leakage flux to the head cores and are regarded as having a linear characteristic that the position signals N and Q relative to the actual track position X are linear within the range below the intersection level, with the position sensitivities keeping constantly unvarying values. More strictly, however, the position signals are under the influence of the leakage flux so that the positions signals are not precisely linear relative to the actual track position X even in the range below the intersection level, thus presenting the nonlinear position sensitivities. Nevertheless, the position sensitivity is regarded as constant within the range below the intersection level to correct the intersection level to a certain level (theoretical value), i.e., to make one-point correction. This does not mean the adjustment of the nonlinear position sensitivities into constant sensitivities. Thus, there lies an error between the intersection level based one-point linear corrected position sensitivities and the actual nonlinear position sensitivities. This position sensitivity error may impede the acquisition of high-precision signals required for the higher track density TPI.

DISCLOSURE OF THE INVENTION

According to the present invention there are provided a storage apparatus and a position sensitivity setting method therefor, capable of acquiring high-precision position signals by further correcting nonlinear position sensitivities once corrected on the basis of the intersection of two position signals demodulated from two-phase servo information, into linear ones.

The storage apparatus of the present invention comprises a position sensitivity adjusting unit and a sensitivity correcting unit. The position sensitivity adjusting unit detects the signal level at the intersection of position signals N and Q having different phases Ø by a predetermined track pitch (TP/n), e.g., TP/2 which are demodulated from read signals of two-phase servo information buried and recorded in a disk medium, the position sensitivity adjusting unit making an adjustment of the gain of an AGC amplifier so that the intersection signal level coincides with a predetermined level. Herein, n represents any arbitrary integers including 1, 2, 3, 4, etc. The sensitivity correcting unit corrects nonlinear position sensitivities relative to the actual track position X of two position signals N and Q output from the AGC amplifier, into linear position sensitivities. In this manner, the present invention feeds by no means the position signals N and Q having nonlinear position sensitivities intactly to the control circuit, but instead creates position signals Na and Qa whose nonlinear position sensitivities have been corrected into linear position sensitivities by the correction circuit, previous to the feed to the control circuit, thereby making it possible to provide a precise head position control irrespective of the nonlinear head detection characteristics whereby a high-precision head position control can be provided especially in the event of the increased track densities of the disk medium.

Herein, the sensitivity correcting unit corrects nonlinear position sensitivities of the position signals N and Q, into linear position sensitivities having certain sensitivities at the intersection detected by the position sensitivity adjusting unit. The sensitivity correcting unit corrects nonlinear position sensitivities of the position signals N and Q into linear position sensitivities within the range of up to the track position corresponding to the intersection from the track center. The sensitivity correcting unit approximates the position sensitivities of two position signals N and Q output from the AGC amplifier by predetermined nonlinear functions to correct them into linear position sensitivities. The sensitivity correcting unit approximates two position signals N and Q relative to the actual track position X output from the AGC amplifier by sine functions $$N = \sin X$$

$$Q = \sin(X - TP/n)$$

the sensitivity correcting unit defining linear functions of two position signals Na and Qa which are corrected relative to the actual track position X, as $$Na = X$$

$$Qa = X - TP/n$$

to thereby obtain relational expressions of the two $$N = \sin Na$$

$$Q = \sin Qa$$

Then, the sensitivity correcting unit figures out from the relational expressions the corrected position signals Na and Qa as $$Na = \sin^{-1} N$$

$$Qa = \sin^{-1} Q$$

to thereby correct nonlinear position sensitivities into linear ones.

The sensitivity correcting unit figures out the linearly corrected position signals Na and Qa from $$Na = \{1/(\sqrt{2} \cdot \cos N)\} \cdot N$$

$$Qa = \{1/(\sqrt{2} \cdot \cos Q)\} \cdot Q$$

which are specific examples of expressions used for obtaining the corrected position signals Na and Qa. These expressions are obtained, in case of converting nonlinear functions into linear functions, by differentiating the nonlinear functions to find the reciprocals and multiplying the nonlinear functions by thus obtained reciprocals. That is, the expressions approximated by sine functions $$N = \sin Na$$

$$Q = \sin Qa$$

are differentiated to obtain the inclinations $$N' = (\sin Na)' = \cos Na$$

$$Q' = (\sin Qa)' = \cos Qa$$

Then the reciprocals of the inclinations are normalized to find product coefficients $$K_N = 1/(\sqrt{2} \cdot \cos N)$$

$$K_Q = 1/(\sqrt{2} \cdot \cos Q)$$

which are multiplied by the nonlinear position signals N and Q to obtain $$Na = K_N \cdot N = \{1/(\sqrt{2} \cdot \cos N)\} \cdot N$$

$$Qa = K_Q \cdot Q = \{1/(\sqrt{2} \cdot \cos Q)\} \cdot Q$$

The sensitivity correcting unit previously prepares, in the form of table information, one of the values of product coefficients as $$K_N = 1/(\sqrt{2} \cdot \cos N)$$

The sensitivity correcting unit determines the product coefficients $K_N$ and $K_Q$ by reference to the table information by position signals P and Q from the AGC amplifier and multiplies the position signals P and Q by the thus determined product coefficients $K_N$ and $K_Q$ to thereby correct nonlinear position sensitivities into linear ones. In this correction using the table information, depending on the polarities of the two the sensitivity correcting unit converts the position signals N and Q into (+, −); +N, +(Q+TP/n)

(+, +); +(2 TP/n−N), +{2 TP/n−(Q+TP/n)}

(−, +); −(2 TP/n+N), +{2 TP/n+(Q+TP/n)}

(−, −); −(4 TP/n−N), −{4 TP/n−(Q+TP/n)} previous to reference to the table information. Thus, by preparing one product coefficient table about the range (−TP/2 n≦N, Q≦TP/2 n) up to the intersection from the track centers of the position signals N and Q, the position sensitivity linear correction can be effected within one cycle range (4 TP/n0 track pitch range) of the position signals N and Q. The sensitivity correcting unit may approximate two position signals N and Q having nonlinear position sensitivities relative to the actual track position X output from the AGC amplifier by cosine functions $$N = \cos X$$

$$Q = \cos(X - TP/2)$$

the sensitivity correcting unit defining two corrected position signals Na and Qa having linear position sensitivities relative to the actual track position X, as linear functions $$Na = X$$

$$Qa = X - TP/2$$

to thereby obtain relational expressions of the two $N = \cos Na$ $Q = \cos Qa$ the sensitivity correcting unit figuring out the corrected position signals Na and Qa from the relational expressions as $Na = \cos^{-1} N$ $Qa = \cos^{-1} Q$ to thereby correct nonlinear position sensitivities into linear ones. In this case, similar to the sine functions, the sensitivity correcting unit figures out corrected position signals Na and Qa from $Na = -\{1/(\sqrt{2} \cdot \sin N)\} \cdot N$ $Qa = -\{1/(\sqrt{2} \cdot \sin Q)\} \cdot Q$ That is, the cosine function approximated relational expressions $N = \cos Na$ $Q = \cos Qa$ are differentiated to obtain the inclinations $N' = (\cos Na)' = -\sin Na$ $Q' = (\cos Qa)' = -\sin Qa$ Then the reciprocals of the inclinations are normalized to obtain product coefficients $K_N = -1/(\sqrt{2} \cdot \sin N)$ $K_Q = -1/(\sqrt{2} \cdot \sin Q)$ which are multiplied by the nonlinear position signals N and Q to obtain $Na = K_N \cdot N = -\{1/(\sqrt{2} \cdot \sin N)\} \cdot N$ $Qa = K_Q \cdot Q = -\{1/(\sqrt{2} \cdot \sin Q)\} \cdot Q$ The sensitivity correcting unit previously prepares, in the form of table information, the value of the product coefficient $K_N = -1/(\sqrt{2} \cdot \sin N)$ for use in calculation of the corrected position signals Na and Qa. The sensitivity correcting unit determines the product coefficients $K_N$ and $K_Q$ by reference to the table information by position signals P and Q from the AGC amplifier and multiplies the position signals P and Q by the thus determined product coefficients $K_N$ and $K_Q$ to thereby correct nonlinear position sensitivities into linear ones. In this case as well, depending on the polarities of the two the sensitivity correcting unit converts the position signals N and Q into (+, +); +(TP/n−N), +{TP/n−(Q+TP/n)}

(−, +); −(TP/n+N), +{TP/n+(Q+TP/n)}

(−, −); −(3 TP/n−N), −{3 TP/n−(Q+TP/n)}

(+, −); +(3 TP/n+N), −{3 TP/n+(Q+TP/n)} previous to reference to the table information.

Furthermore, the sensitivity correcting unit may approximate the nonlinear functions of two position signals N and Q relative to the actual track position X output from the AGC amplifier by polynomial expressions $N = A_N X^N + A_{N-1} X^{N-1} + \ldots + A_0$ $Q = A_N (X - TP/n)^N + A_{N-1} (X - TP/n)^{N-1} + \ldots + A_0$ the sensitivity correcting unit defining linear functions of two corrected position signals Na and Qa relative to the actual track position, as $Na = X$ $Qa = X - TP/n$ to thereby obtain relational expressions of the two $N = A_N Na^N + A_{N-1} Na^{N-1} + \ldots + A_0$ $Q = A_N Qa^N + A_{N-1} Qa^{N-1} + \ldots + A_0$ to thereby correct nonlinear position sensitivities into linear ones.

The present invention further provides a position sensitivity setting method for a storage apparatus, comprising a position sensitivity adjustment step which includes detecting the signal level at the intersection of position signals N and Q having different phases Ø by a predetermined track pitch (TP/n) which are demodulated from read signals of two-phase servo information buried and recorded in a disk medium, the position sensitivity adjustment step including making an adjustment of the gain of an AGC amplifier so that the intersection signal level coincides with a predetermined level; and a sensitivity correcting step which includes correcting nonlinear position sensitivities relative to the actual track position X of two position signals N and Q output from the AGC amplifier, into linear position sensitivities.

BRIEF DESCRIPTION OF THE DRAWINGS

FIGS. 3A and 3B are block diagrams showing an embodiment of the present invention;

FIG. 10 is an explanatory diagram of the normalized product coefficient stored in the memory table of FIGS. 7 and 8;

FIGS. 11A and 11B are explanatory diagrams of position signal polarities and table lookup values obtained in the memory reading unit of FIG. 9;

FIG. 17 is a characteristic diagram of the product coefficient $K_N$ normalized over the range of $0<N\leq0.25$ TP of FIG. 15;

FIG. 18 is a Bode diagram showing variances in the open loop gain of the head detection system, relative to the head position;

FIGS. 23A and 23B are explanatory diagrams of the polarities and table lookup values obtained in the memory reading unit of FIG. 9 when the normalized product coefficient $K_N$ of FIG. 22 is stored in the memory table;

BEST MODE FOR CARRYING OUT THE INVENTION

Figure 1:
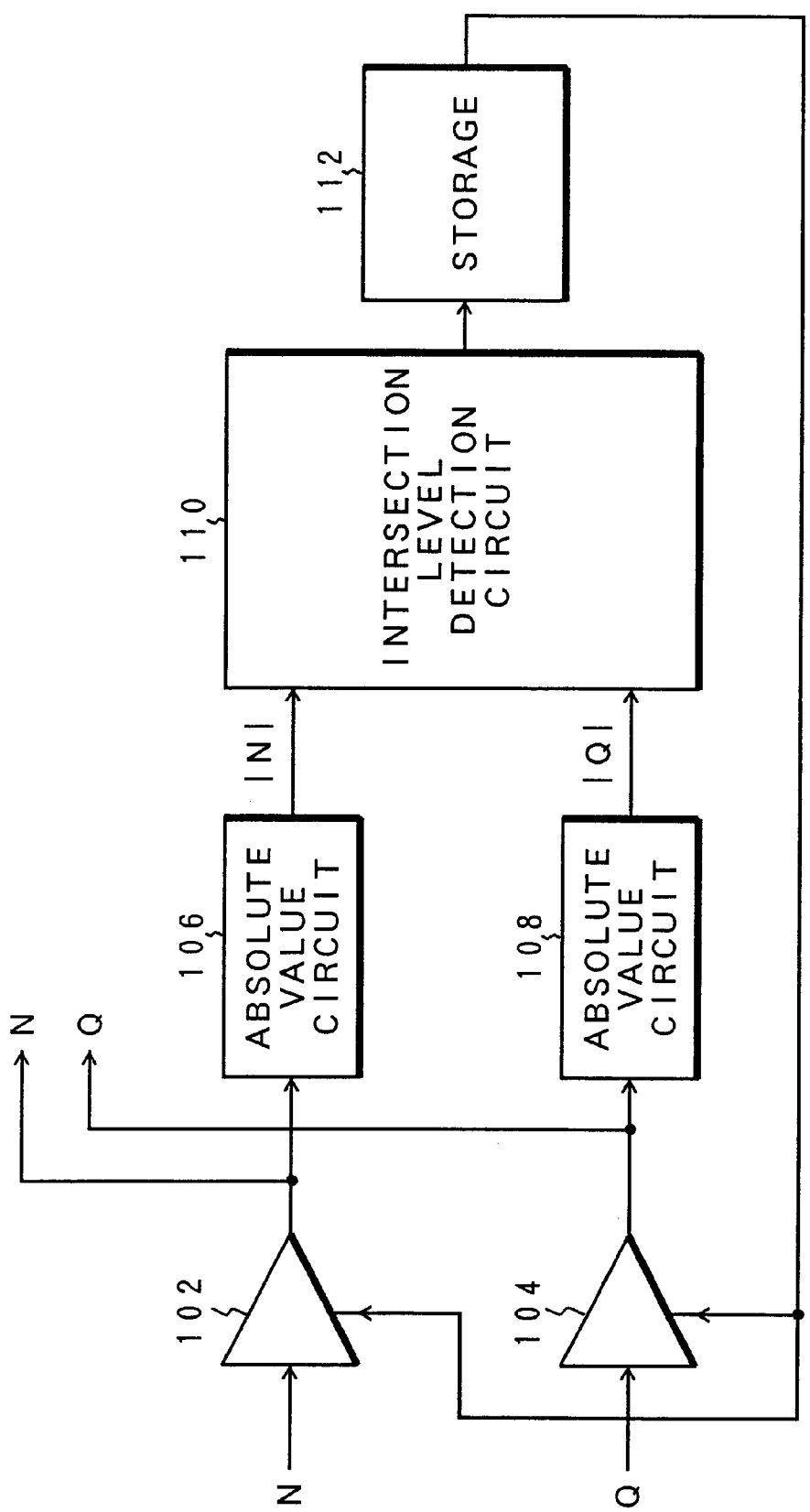
FIG. 1 is a block diagram of a conventional apparatus.
Figure 2A:
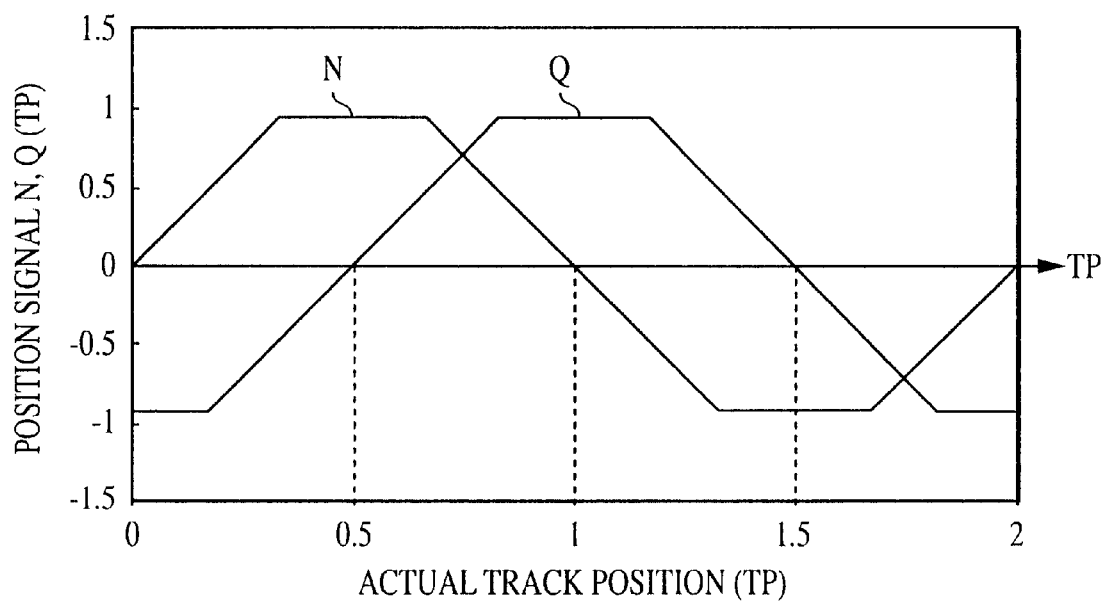
FIGS. 2A and 2B are characteristic diagrams of position signals N, Q and their absolute values, relative to the actual track position when the conventional position sensitivity is regarded as linear.
Figure 2B:
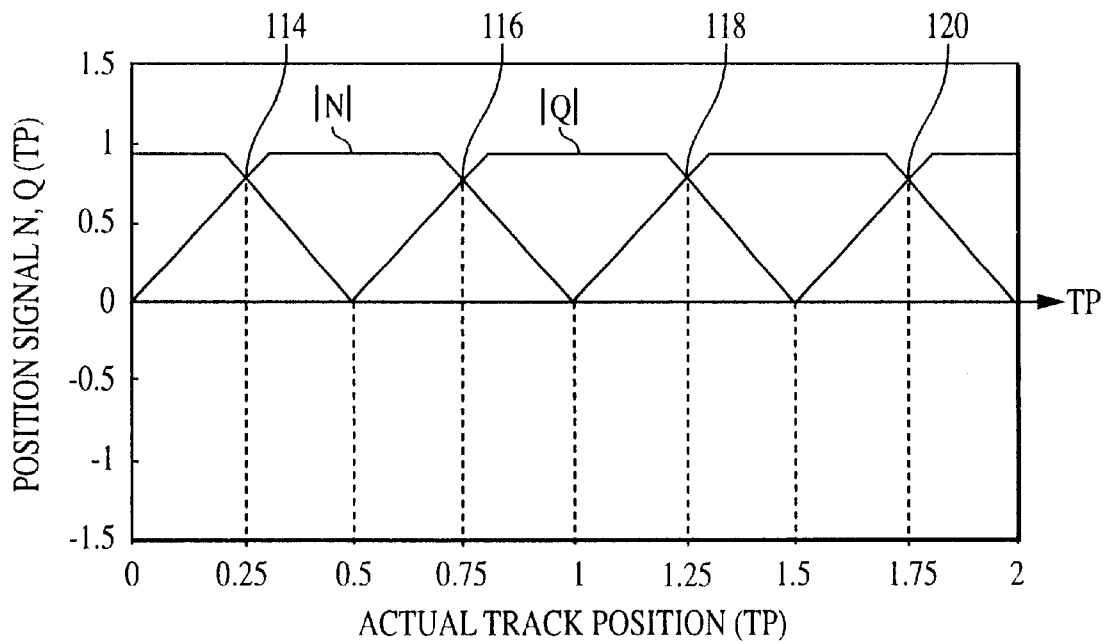
Figure 3B:
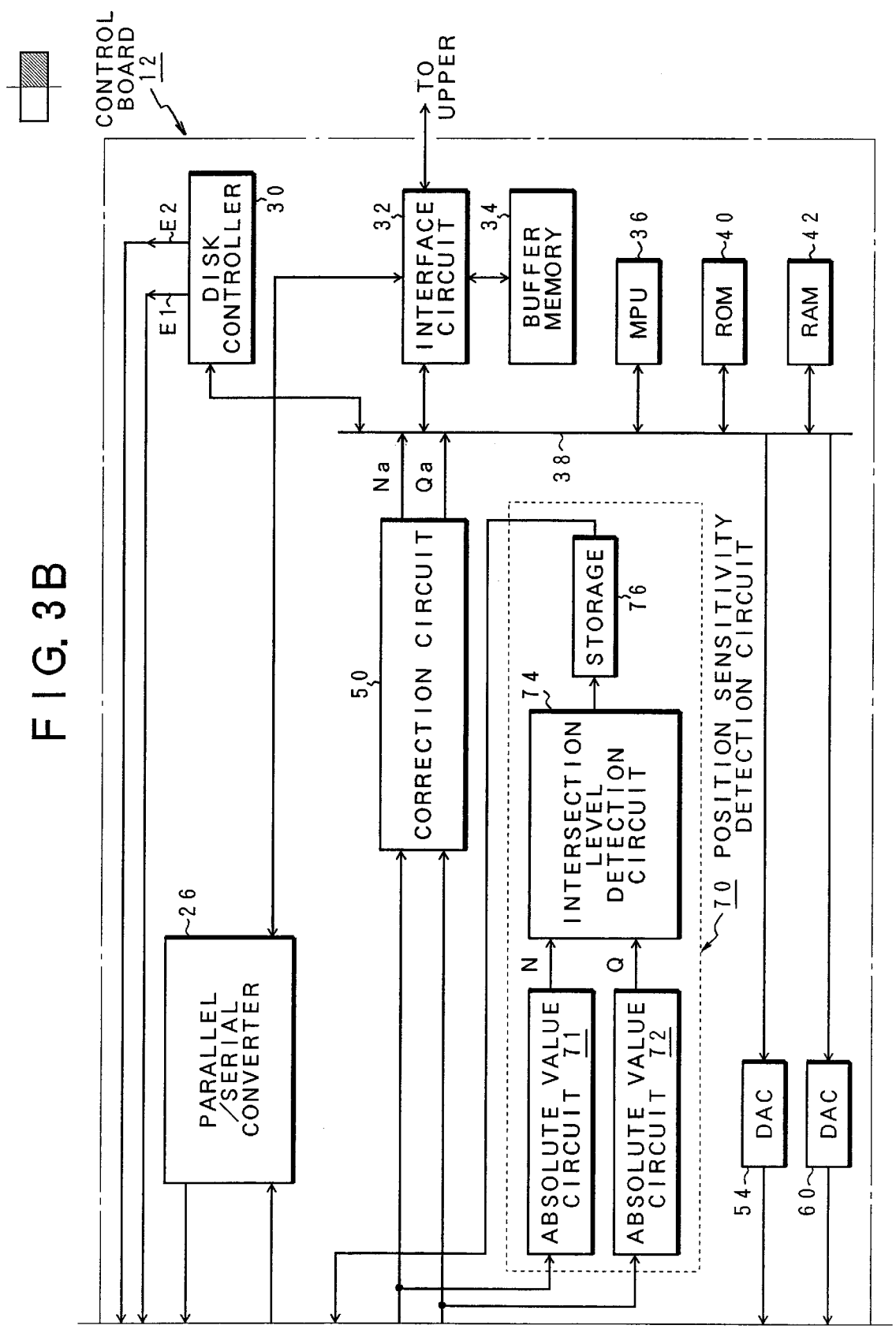

FIGS. 3A and 3B are block diagrams of a magnetic disk unit to which is applied a position sensitivity adjusting apparatus in accordance with the present invention. Referring to FIGS. 3A and 3B, the disk unit known as the hard disk drive is made up of a disk enclosure 10 and a control board 12. The disk enclosure 10 comprises a head IC circuit 20 to which in this embodiment four combined heads 14-1 to 14-4 are connected. The combined heads 14-1 to 14-4 are provided integrally with write heads 16-1 to 16-4, respectively, and with read heads 18-1 to 18-4, respectively. The write heads 16-1 to 16-4 can be inductive heads and the read heads 18-1 to 18-4 can be MR heads. The disk enclosure 10 further comprises a VCM 58 for driving a head actuator and a spindle motor 64 for rotating a magnetic disk.

Figure 4:
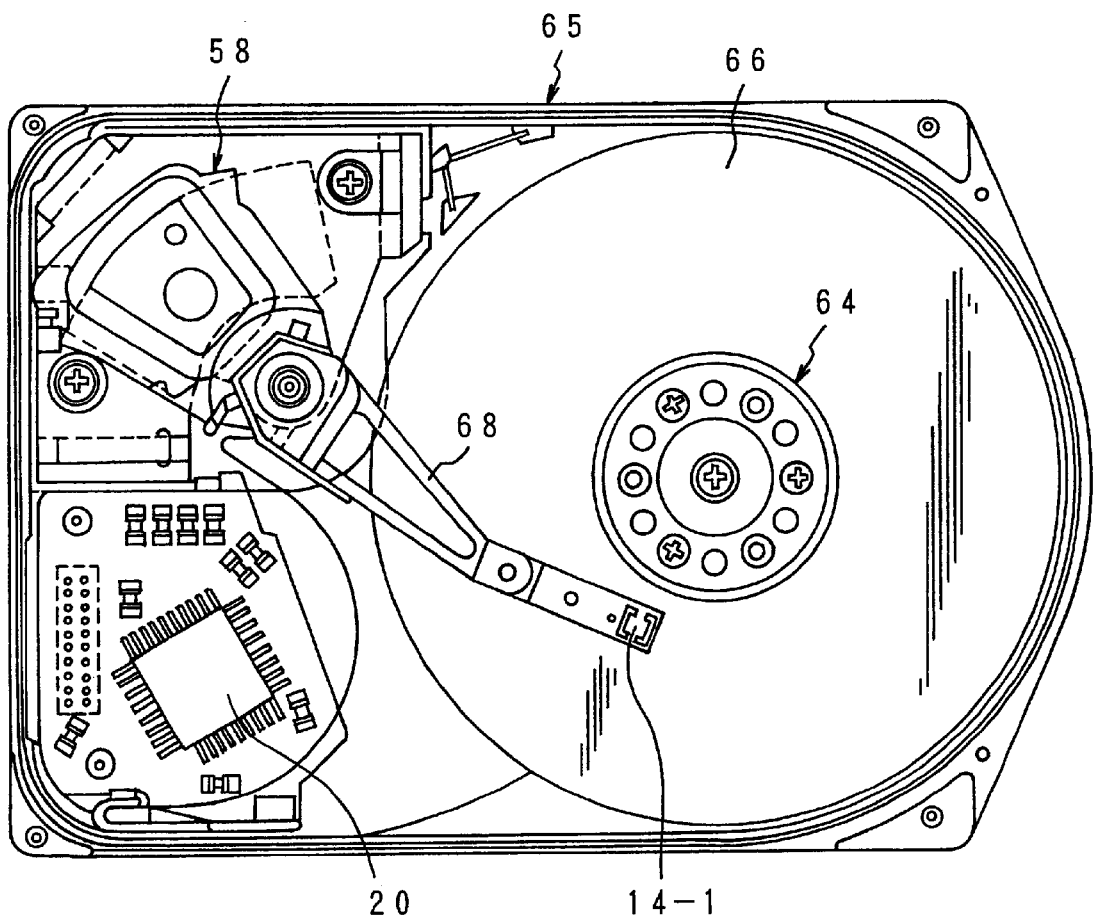
FIG. 4 is a structure explanatory diagram of a disk apparatus of the present invention.

FIG. 4 shows by way of example the internal structure of the disk enclosure 10 of FIGS. 3A and 3B. Referring to FIG. 4, the magnetic disk designated at 66 and rotated by the spindle motor 64 is placed within a cover 65 of the disk drive. Since the disk enclosure of this embodiment includes the four combined heads 14-1 to 14-4 as seen in FIGS. 3A and 3B, two magnetic disks 66 are placed to provide a total of four data surfaces. Each magnetic disk 66 is associated with the head actuator designated at 68 and turned by the VCM 58. The head actuator 68 carries at its extremity the combined head 14-1. In the vicinity of the head actuator 68 is located the head IC circuit 20 which is mounted on a circuit board. The head IC circuit 20 is mounted on a flexible printed board having a band portion by which is made an electrical connection with the head actuator 68.

Referring again to FIGS. 3A and 3B, the control board 12 providing circuit units for the disk enclosure 10 comprises read/write associated circuit units and a servo circuit unit for the head positioning. The read associated circuit unit includes an AGC amplifier 22 and a read demodulation circuit 24. Upon the read operation, in response to a head switching signal E1 from the disk controller 30 based on a command from a host apparatus and to a signal making the read side of a read/write switching signal E2 valid, the head IC circuit 20 selects one of the combined heads 14-1 to 14-4 and connects its read head to the AGC amplifier 22. In case of using the MR heads as the read heads, the head IC circuit 20 feeds a sense current to the MR heads. A read signal from the read head is amplified to have a certain amplitude by the AGC amplifier 22 and then read data are demodulated by the read demodulation circuit 24. In case of the partial response class 4 maximum likelihood (PR4ML) detection for example, the read demodulation circuit 24 makes the equalization of (1+D) by an equalizer circuit and thereafter demodulates bit data by a maximum likelihood detection circuit in response to a Viterbi detection. The thus demodulated bit data are converted into NRZ data by an RLL decoder and then further converted into parallel NRZ data by a parallel-serial converter 26. The NRZ data are then transferred via an interface circuit 32 to a buffer memory 34. When the amount of storage of the buffer memory 34 exceed a certain value, the interface circuit 32 transfers the read data to the host apparatus. Upon the write operation, a write modulation circuit 28 accepts serial NRZ data converted by the parallel-serial converter 26 from parallel write data from the host which is transferred from the buffer memory 34 by way of the interface circuit 32. The write modulation circuit 28 first converts the accepted serial NRZ data into RLL codes. Then after the preceding of 1/(1+D), the write modulation circuit 28 makes a write compensation for the retention by a write FF, after which the compensated data are fed by a driver via the head IC circuit 20 to the write head selected at that time to perform the write onto a disk medium. An MPU 36 provides the global control of the control board 12. The MPU 36 is associated via a bus 38 with a RAM 40 and is further associated with the disk controller 30 and the interface circuit 32. The MPU 36 accepts and interprets various commands from the host controller by way of the interface circuit 32 to provide a read/write instruction to the disk controller 30 and a head positioning control by the VCM 58 provided in the disk enclosure 10. To drive the VCM 58, the bus 38 is associated with a D/A converter 54 and a driver 56 so that the VCM 58 can be driven in response to the instruction from the MPU 36. The D/A converter 60 and the driver 62 also provide the drive of the spindle motor 64.

The control board 12 is provided as a position demodulation unit with a position signal demodulation circuit 44, AGC amplifiers 46 and 48, a correction circuit 50 and a position sensitivity detection circuit 70. In this embodiment, two-phase servo information is written by a sector servo onto the magnetic disk 66 of FIG. 4 and a read signal from the AGC amplifier 22 is fed to the position signal demodulation circuit 44. Two position signals N and Q having different (½ TP) phase are demodulated from a read signal acquired at the servo frame timing. The thus demodulated signals are amplified by the AGC amplifiers 46 and 48 to have a certain position sensitivity, after which the signals are converted into digital data by an A/D converter incorporated in the correction circuit 50 and are fetched into the MPU 36. The position sensitivity detection circuit 70 is made up of absolute value circuits 71 and 72, an intersection level detection circuit 74 and a storage 76, and operates at the calibration timing upon the apparatus deliver or activation. The absolute value circuits 71 and 72 provide as their outputs absolute values of the two position signals N and Q obtained by the AGC amplifiers 46 and 48. The intersection level detection circuit 74 detects the level of the intersection where the levels of the two absolute position signals N and Q coincide with each other and stores it in the storage 76. Upon the position signals demodulation, the AGC amplifiers 46 and 48 have gains for setting the intersection level stored in the storage 76 to a certain level (theoretical value). For this reason, the amplification is made such that the intersection level of the demodulated position signals N and Q is constantly kept at a certain level (theoretical value), thereby enabling a constantly unvaried position sensitivity to be acquired in spite of the different heads. The correction circuit 50 accepts the position signals N and Q subjected to the position sensitivity correction by the AGC amplifiers 46 and 48 and corrects the position signals N and Q having a nonlinear position sensitivity into position signals Na and Qa having a linear position sensitivity, for the supply to the MPU 36. On the basis of the two position signals Na and Qa derived from the correction circuit 50, the MPU 36 provides a coarse control upon the seek operation and a fine control upon the seek termination. That is, in the coarse control, the MPU 36 differentiates the position signal Na at the center position of the cylinder address and the position signal Qa at the boundary position of the cylinder address to obtain the velocities and provides the velocity control of the acceleration, constant velocity and deceleration on the basis of the remaining cylinder number relative to the target cylinder address at that time. Once the current cylinder address reaches the target cylinder address as a result of this coarse control, switching is made to the fine control to provide a positioning control so that the position signal Na or Qa being obtained at that time can have the value of the track center.

Figure 5:
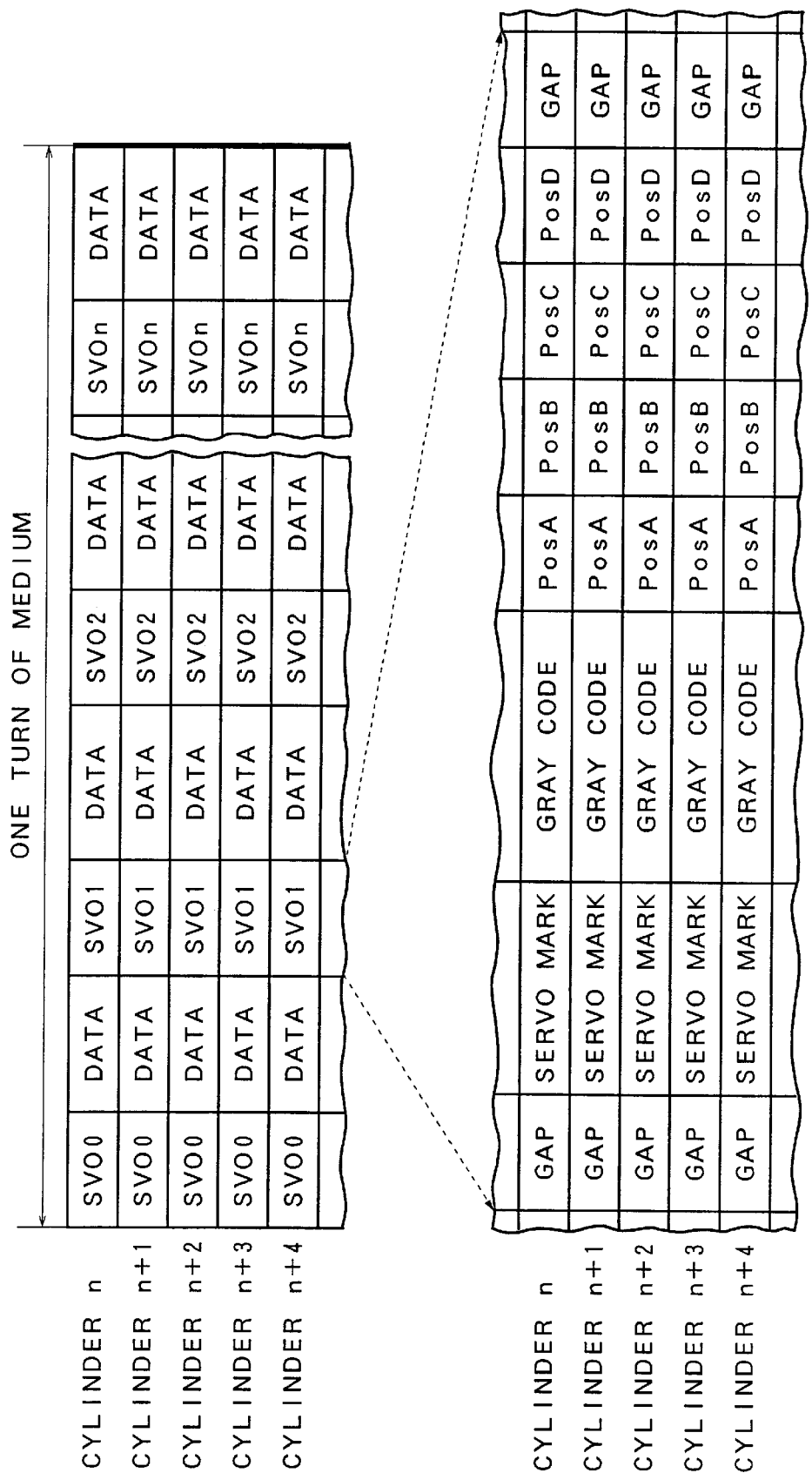
FIG. 5 is a format explanatory diagram of a sector servo effected in a disk medium.
Figure 6:
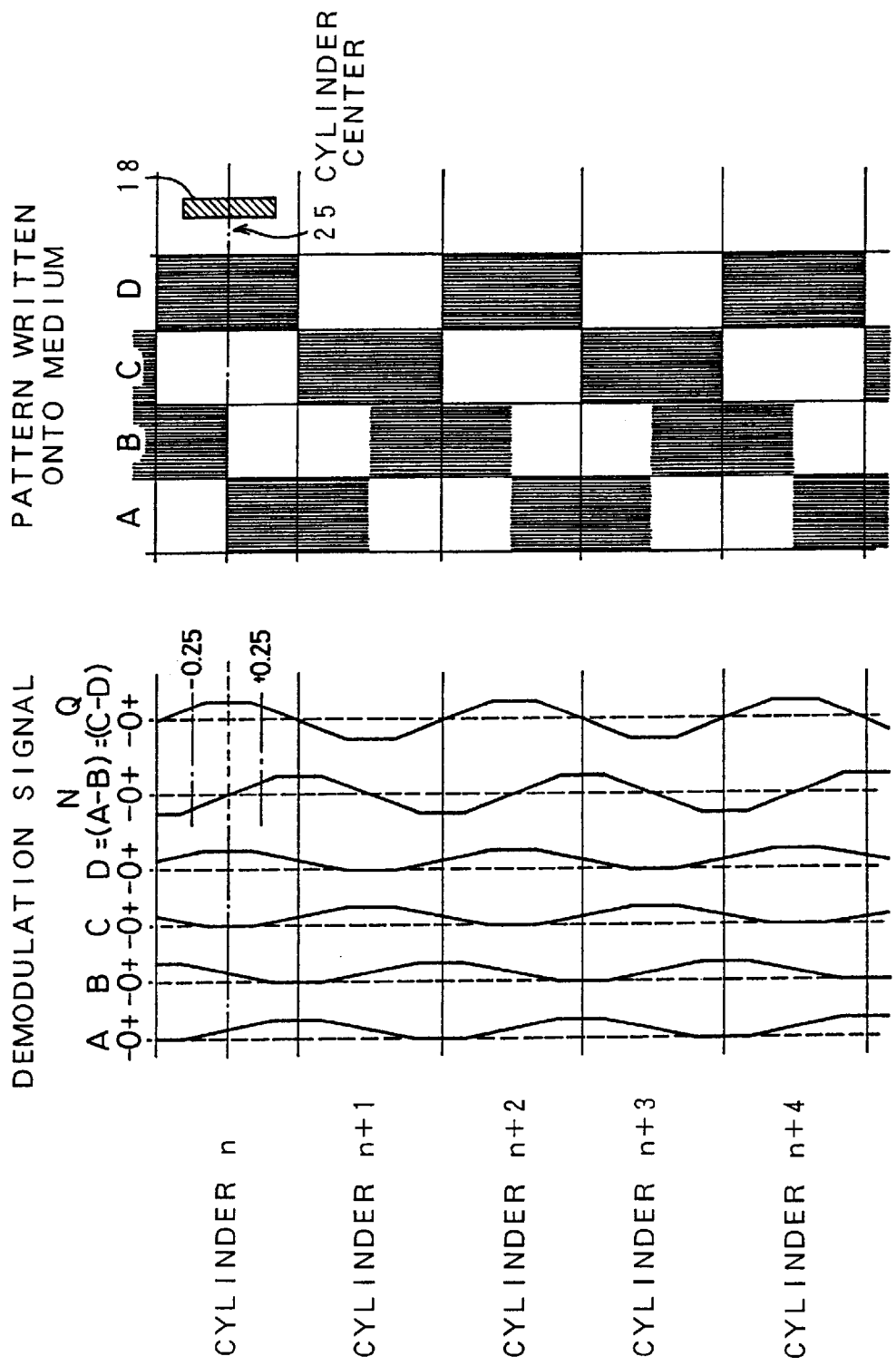
FIG. 6 is an explanatory diagram of a position demodulation signal relative to the head position of a two-phase servo pattern recorded in a servo frame of FIG. 5.

Description is now made of the sector servo format on the magnetic disk 66 of FIG. 4. FIG. 5 represents a track format for one turn of the medium, of the cylinders n to n+4 on the magnetic disk. The cylinders n to n+4 include 0 to n sectors, each sector being made up of a servo frame SVO and a data frame DATA. As shown in an enlarged manner below for the servo frame SVO1, the servo frame is made up of the gap, servo mark, gray code, tow-phase servo pattern indicated by PosA, B, C and D and the gap. The servo mark indicates the servo frame start position. The gray code represents the cylinder address. The two-phase servo patterns PosA to D represent the record of the servo patterns A, B, C and D shown on the right side of FIG. 6. That is, the patterns A and B have a 0.5 cylinder width on both sides of the cylinder boundary of the cylinder n, n+1, n+2, . . . as the center position, to thereby allow the recording of the pattern having a frequency sufficiently higher than the data recording frequency. With an 0.5 cylinder offset relative to the patterns A and B, the patterns C and D are recorded within the range of cylinder width of 0.5 cylinder on both sides of the cylinder center of the cylinders n, n+1 and N+2. Herein, one cylinder width means one track pitch (TP). For such a two-phase servo pattern made up of the patterns A to D, the read head 18 is moved in the radial direction of the disk to obtain the demodulation signals A, B, C and D shown on the left side. Then the position signal N is obtained from the difference between the demodulation signals A and B, and the position signal Q is obtained from the difference between the demodulation signals C and D. Switching is made such that the position signal N is used in, e.g., ±0.5 track pitch range around the cylinder center and that the position signal Q is used in ±05 pitch range around the cylinder boundary. Herein, the position signals N and Q can be expressed as a general form by Ø=TP/n, where n is any arbitrary integer 1, 2, 3, 4, . . . , FIG. 6 showing the case of n=2. The following embodiment shows the case of Ø=TP/2 with n=2 by way of example, but naturally Ø=TP/3 with n=3 or Ø=TP/4 with n=4 is also feasible.

Figure 7:
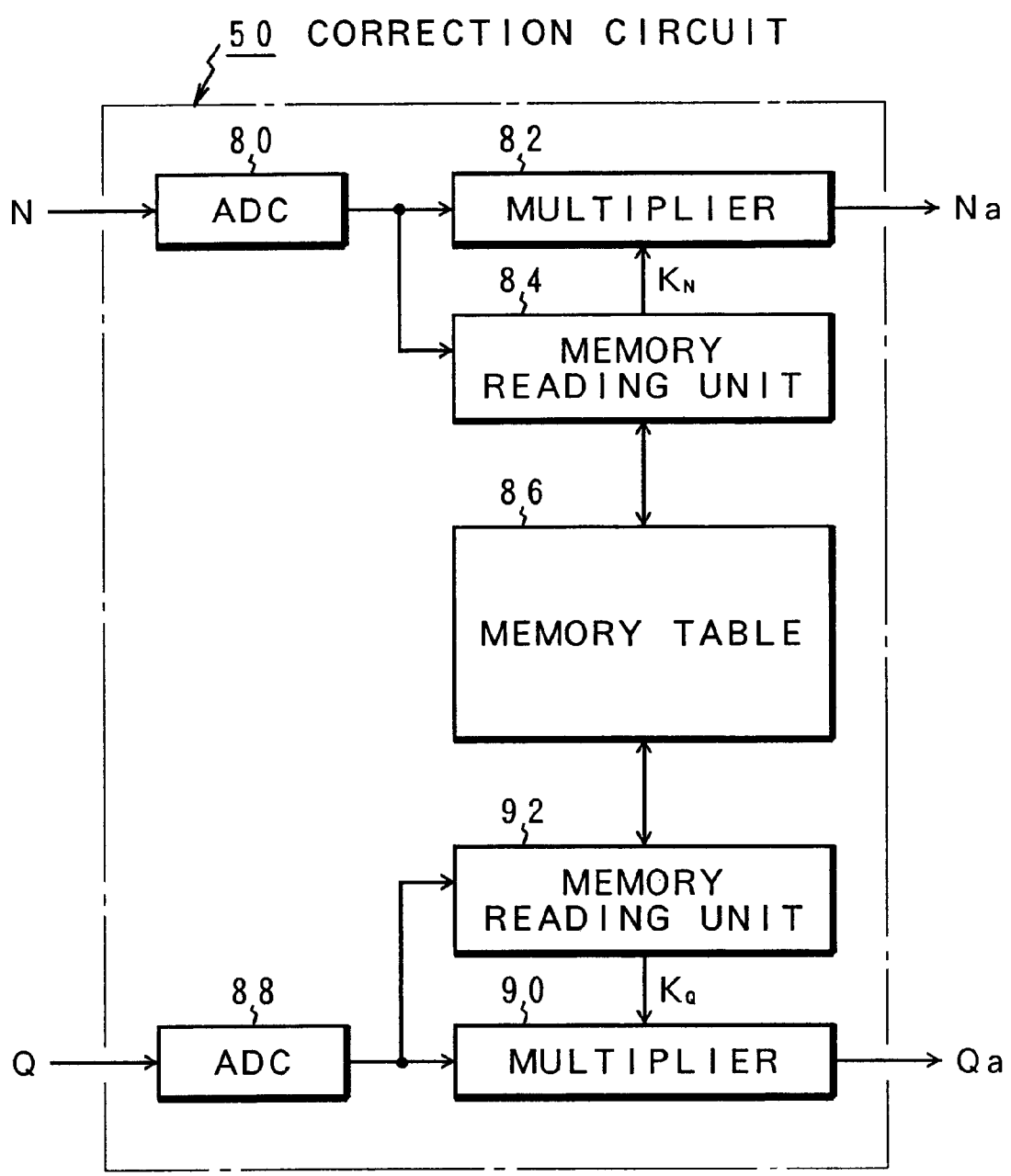
FIG. 7 is a block diagram of a correction circuit for correcting the FIG. 3 position signal position sensitivity from nonlinear into linear.

FIG. 7 is a block diagram of the correction circuit 50 of FIGS. 3A and 3B. In order to correct the position sensitivity of the position signal N from nonlinear into linear, the correction circuit 50 is provided with an A/D converter 80, a multiplier 82, a memory reading unit 84 and a memory table 86. To correct the position sensitivity of the position signal Q from nonlinear into linear, the correction circuit 50 is provided with an A/D converter 88, a multiplier 90 and a memory reading unit 92, and shares the memory table 86 with the position signal N. In the memory table 86 are previously stored product coefficients $K_N$ and $K_Q$ for correcting the position sensitivities of the position signals N and Q from nonlinear into linear, with the position signals N and Q as the addresses. For this reason, the position signals N and Q fetched by the A/D converters 80 and 88 for the conversion into digital data are fed to the memory reading units 84 and 92 to read corresponding product coefficients $K_N$ and $K_Q$ by their respective reference to the memory table 86. The multipliers 82 and 90 multiply the position signals N and Q with the thus read product coefficients $K_N$ and $K_Q$ to provide as their outputs position signals Na and Qa having position sensitivities corrected from nonlinear into linear. That is, the correction circuit 5 makes a correction operation given by $$Na = K_N \cdot N \quad (1)$$

$$Qa = K_Q \cdot Q \quad (2)$$

Figure 8:
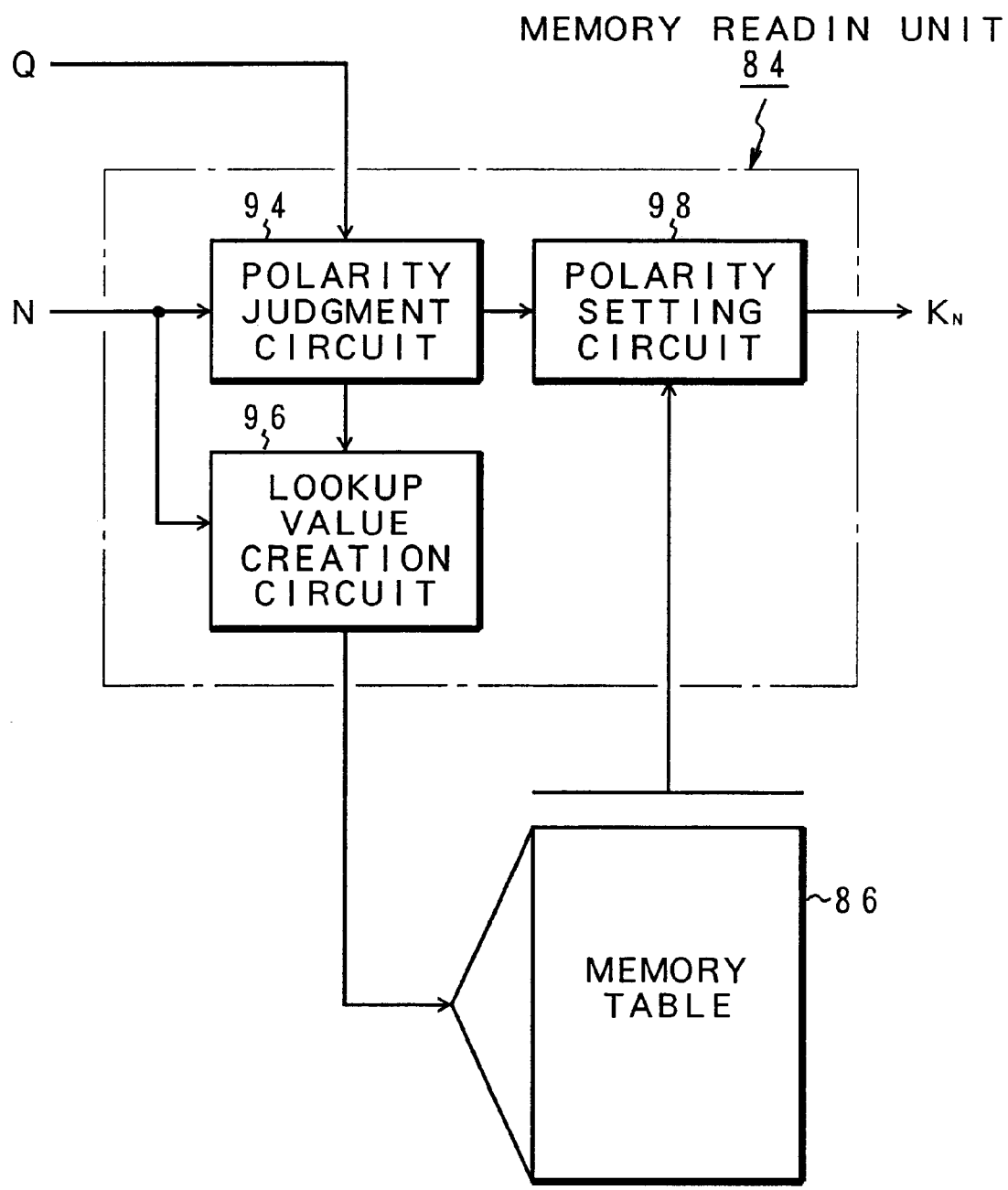
FIG. 8 is a block diagram of a memory reading unit of FIG. 7.

FIG. 8 is a block diagram of the memory reading unit 84 provided on the position signal N side of FIG. 7. The memory reading unit 84 is made up of a polarity judgment circuit 94, a lookup value creation circuit 96 and a polarity setting circuit 98. The circuit function of the memory reading unit 84 corresponds to the fact that the memory table 86 stores normalized product coefficients $K_N$ and $K_Q$ for the position signals N and Q shown in the characteristic diagram of FIG. 9. The contents of the memory table 86 indicated by the characteristic curve 100 of FIG. 9 include the storage of the normalized product coefficients $K_N$ and $K_Q$ indicated by the axis of ordinates over the range of the position signals N and Q indicated by the axis of abscissas given as $$0.00 \text{ TP} \leq N, Q \leq 0.25 \text{ TP}$$

The characteristic curve 100 of the normalized product coefficients $K_N$ and $K_Q$ for the position signals N and Q is stored as table information shown in FIG. 10 in the memory table 86. That is, an address 86-1 of the memory table 86 corresponds to the position signals N and Q, with a data region 86-1 storing the numerical values of the product coefficients $K_N$ and $K_Q$ given by the characteristic curve 100 of FIG. 9. In this case, the memory table 86 of FIG. 10 stores the product coefficients for 25 address per 0.01 over the range of the position signals N and Q given by $$0.00 \text{ TP} \leq N, Q \leq 0.25 \text{ TP}$$

Figure 9:
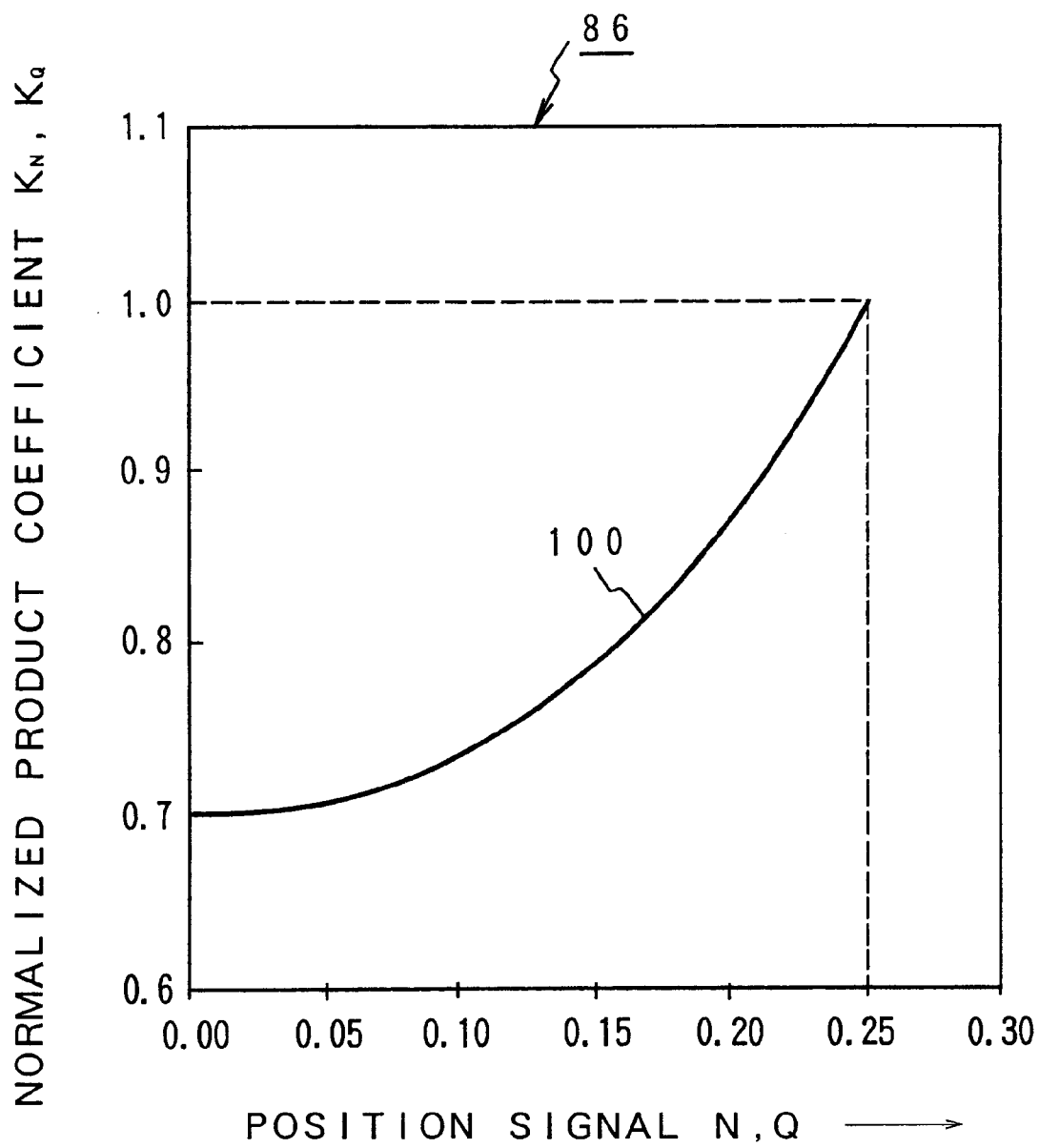
FIG. 9 is a characteristic diagram of a normalized product coefficient stored in a memory table of FIGS. 7 and 8.

However, this is merely for the simplicity of description, and actually the range of the position signals N and Q is divided into 1,000 addresses for example so as to store the product coefficients corresponding to the respective addresses. More specifically, the resolving power of the memory table 86 is determined depending on the bit count of the digital data output from the A/D converters 80 and 88 of FIG. 7. The characteristic curve 100 of the memory table 86 of FIG. 9 shows the storage of the product coefficients $K_N$ and $K_Q$ normalized to correct the position sensitivity from nonlinear into linear. In the memory unit 84 of FIG. 8, due to the sharing of the characteristic curve 100 of the memory table 86 by the two position signals N and Q having different phases by 0.5 track pitch, the polarity judgment circuit 94 judges the polarity of the position signal N and the position signal Q and, on the basis of this result the lookup value creating circuit 96 creates lookup values of the memory table 86 of the position signal N to be corrected so that the corresponding product coefficient KN can be read by reference to the memory table 86 through the creation of the lookup values even though the position signal N is out of the range of $0.00 \leq N \leq 0.25$ TP in the memory table 86 of FIG. 9. The configuration of such a memory reading unit 84 associated with the position signal N is equal to that of the memory reading unit 92 associated with the position signal Q of FIG. 7. That is, in place of the position signal N the position signal Q is used as the input signal to the polarity judgment circuit 94 and the lookup value creation circuit 96 of FIG. 8, with the sole input of the position signal N in place of the position signal S to the polarity judgment circuit 94.

FIGS 11A and 11B show polarity table lookup values corresponding to variances of the position signals N and Q per cycle for use in read of the memory table 86 of FIG. 9 by the memory reading unit 84 and 90 provided in the correction circuit 50 of FIG. 7. That is, as shown in FIG. 7, the position signals iterate their one cycle variance for each two cylinders, i.e., two tracks, so that the track range below the intersection level of the position signals N and Q in one cycle is divided as shown in FIG. 11A when represented by the track pitch T into four regions $$0.00 \text{ TP} < N \leq 0.25 \text{ TP}$$

$$0.75 \text{ TP} < N \leq 1.00 \text{ TP}$$

$$1.00 \text{ TP} < N \leq 1.25 \text{ TP}$$

$$1.75 \text{ TP} < N \leq 2.00 \text{ TP}$$

The signal polarities of the position signals N and Q are (+, −) (+, +) (−, +) and (−, −) in these four regions, respectively. The memory table 86 of the characteristic curve 100 of FIG. 9 is created for the position signal N track range $0.00 \leq N \leq 0.25$. Thus, for the other regions and the position signal N, the shown table lookup values may be looked up to read corresponding normalized product coefficients from the memory table 86 of FIG. 9. Since the position signal Q has a phase lag of 0.5 track pitch relative to the position signal N, the Q signal table lookup value can be obtained by placing $$N = Q + 0.5 \text{ TP}$$

in N signal table lookup value. The Q signal table lookup value of FIG. 11A is actually set as in FIG. 11B.

Figure 12:
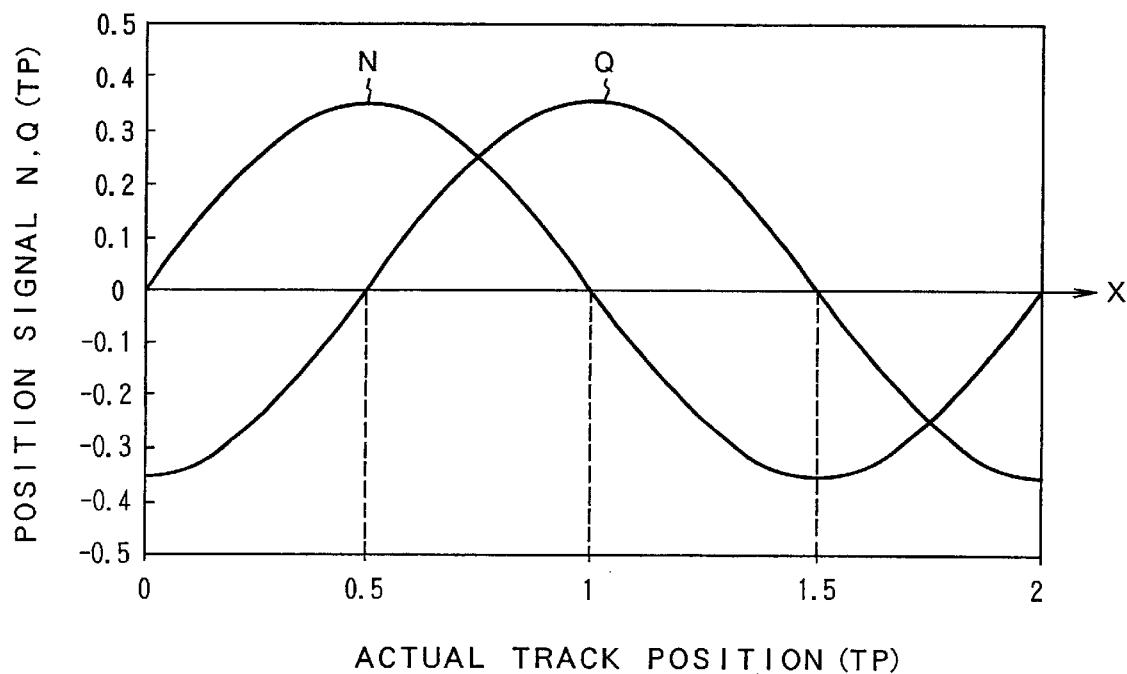
FIG. 12 is a characteristic diagram of the position signals N, Q previous to the position sensitivity correction of FIG. 3, relative to the actual track position.

Description will then be made of the principle for correcting the nonlinear position sensitivity possessed by the position signals N and Q into the linear position sensitivity, effected by the correction circuit 50 of FIGS. 7 and 8 storing the characteristic curve 100 of FIG. 9 therein. FIG. 12 is a characteristic diagram with the axis of abscissas representative of the actual track position X and with the axis of ordinates representative of the position signals N and Q. Herein, the actual track position X and the position signals N and Q use numerical values expressed by the track pitch TP. The position signal varies through one cycle within the range of $0 \leq X \leq 2$ TP of the actual track position X of FIG. 12 whereas the position signal Q varies through the same one cycle with a phase lag of 0.5 TP. The position signals N and Q are approximated by the sine function of the actual track position X as $$N = \sin X \tag{3}$$

$$Q = \sin (X - 0.5 \, TP) \tag{4}$$

Figure 13:
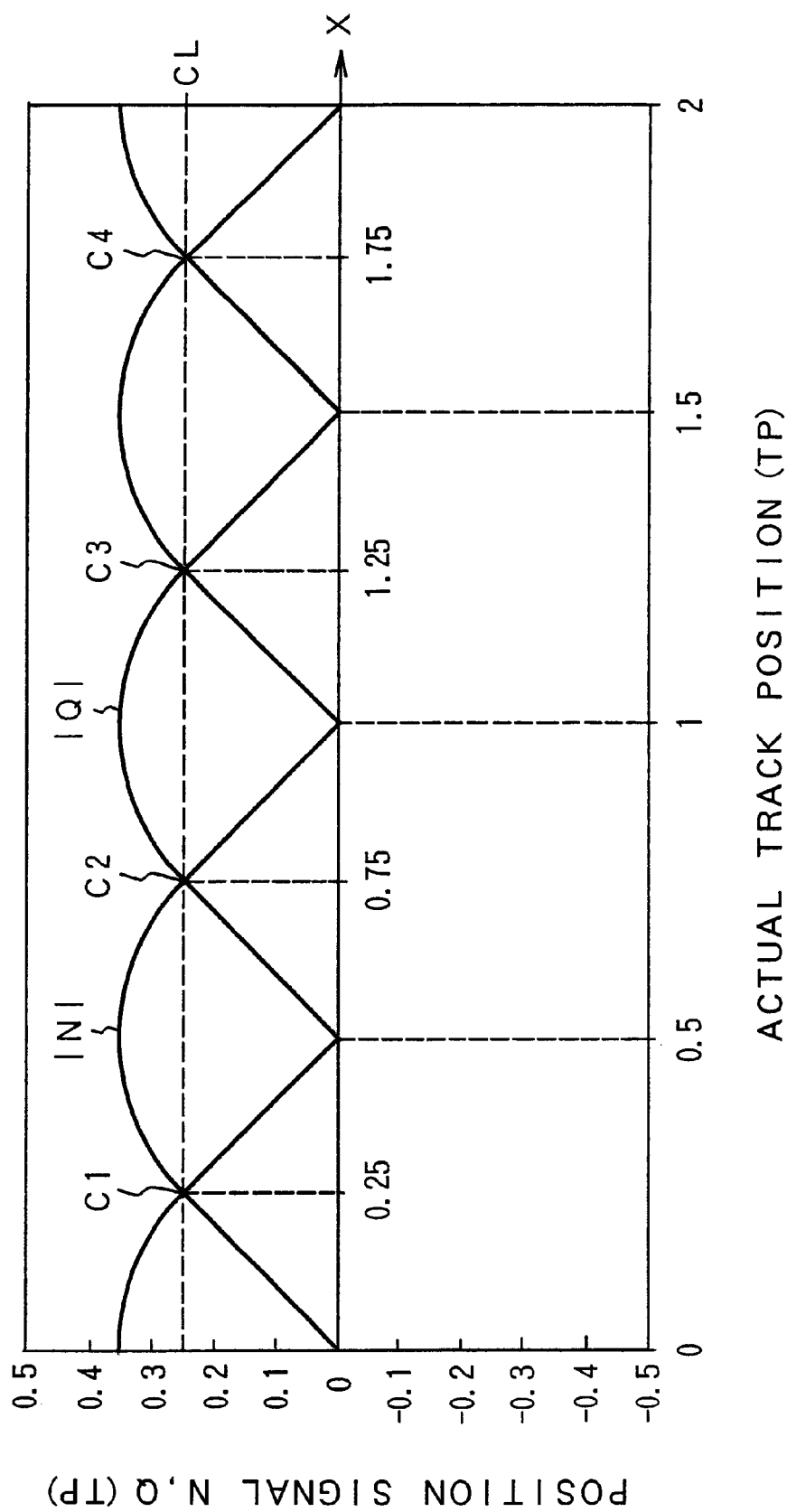
FIG. 13 is a characteristic diagram of absolute values of the position signals N, Q previous to the position sensitivity correction of FIG. 3, relative to the actual track position.

FIG. 13 shows absolute values of the position signals N and Q of FIG. 12, with the intersections C1, C2, C3 and C4 therebetween being a constant value 0.25 TP for the position signals N and Q but being X=0.25 TP, 0.75 TP, 1.25 TP and 1.75 TP for the actual track position X. As is apparent from FIG. 12, the position signals N and Q are approximated by the sine function which is nonlinear relative to the actual track position X. For this reason, as in FIG. 13, even though the position sensitivity is kept unvaried by detecting the intersections C1 to C4 of the absolute values of the position signals N and Q and making amplification thereof by the AGC amplifier whose gain has been set so as to allow the intersection levels to coincide with a certain level, the position sensitivity below the intersections C1 to C4 remains nonlinear. Such nonlinear position signals N and Q are provided as input for the correction into position signals Na and Qa whose position sensitivities are linear in this embodiment. Since the position sensitivities of the corrected position signals Na and Qa relative to the actual track position X are linear, $$Na = X \tag{5}$$

$$Qa = X - 0.5 \, TP \tag{6}$$

results. Thus, by substituting the expressions (1) and (2) by the corrected position signals Na and Qa of expressions (3) and (4), between the pre-correction position signals N and Q and the post-correction position signals Na and Qa there is a relationship given as $$N = \sin Na \tag{7}$$

$$Q = \sin Qa \tag{8}$$

That is, the position sensitivities of the position signals Na and Qa are linear although the position sensitivities of the position signals N and Q actually obtained by approximating them by a sine function are nonlinear. For this reason, from the relationships of the expressions (7) and (8), the position signals Na and Qa having the linear position sensitivities can be obtained by $$Na = \sin^{-1} N \tag{9}$$

$$Qa = \sin^{-1} Q \tag{10}$$

Figure 14:
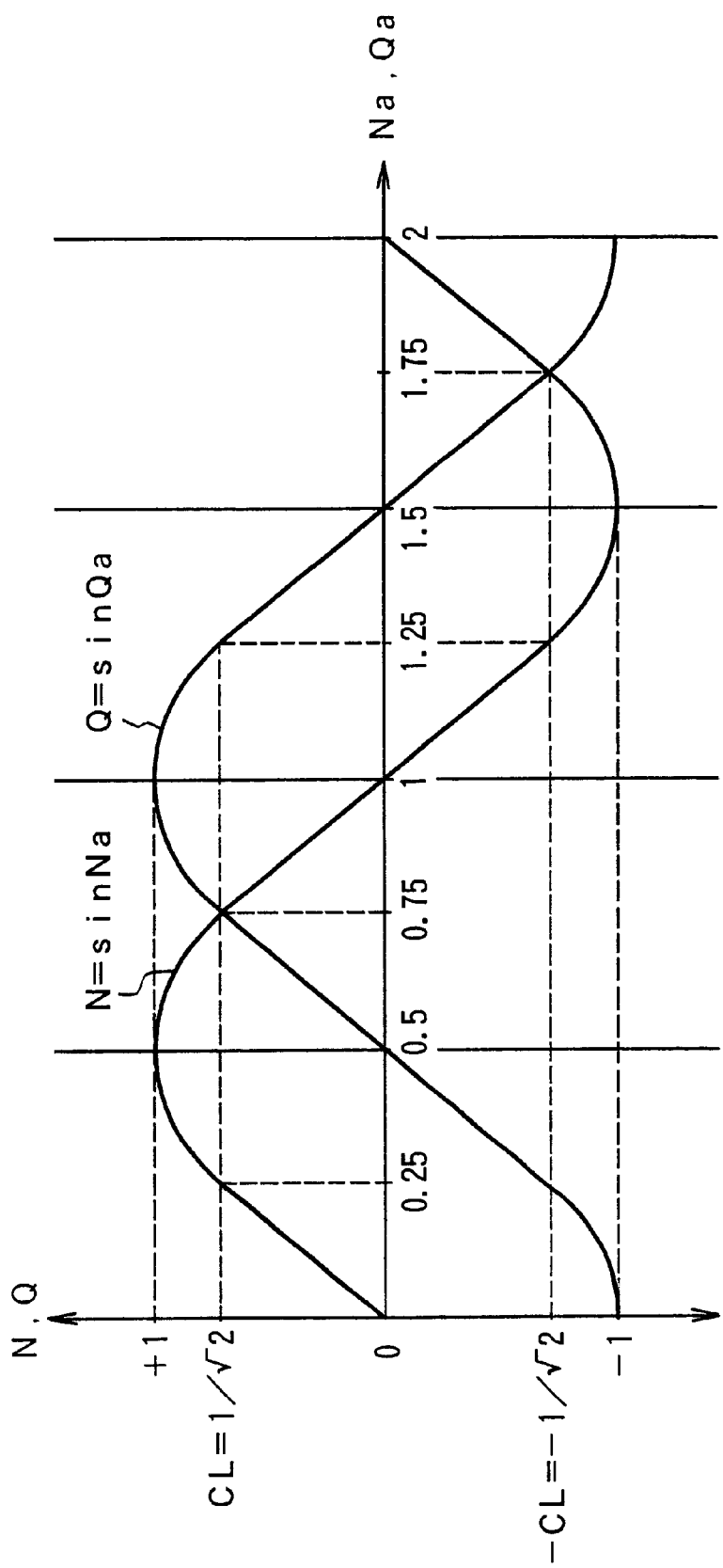
FIG. 14 is a characteristic diagram of position signals N, Q having a nonlinear position sensitivity, relative to position signals Na, Qa having a linear position sensitivity approximated by a sine function.

The expansion of the expressions (9) and (10) is specifically carried out as follows. FIG. 14 shows the characteristics with the axis of abscissas representative of the position signals Na and Qa having the linear position sensitivities of the expressions (7) and (8) and with the axis of ordinates representative of nonlinear position signals N and Q. Herein, the position signals Na and Qa on the axis of abscissas are expressed by the track pitch TP whereas the position signals N and Q on the axis of ordinates are expressed by values normalized with the maximum amplitude value of 1. In this case, the intersection level CL of the position signals N and Q is given as CL=1/√2. From the sine functions of the expressions (7) and (8) in FIG. 14, the nonlinear position sensitivities on the axis of ordinates relative to the linear position sensitivities on the axis of abscissas are inclinations of the position signals N and Q relative to the position signals Na and Qa and hence can be expressed by differentiated sine curves. Thus, the expressions (7) and (8) are differentiated to obtain the inclinations N' and Q' as $$N'=(\sin Na)'=\cos Na \tag{11}$$

$$Q'=(\sin Qa)'=\cos Qa \tag{12}$$

Figure 15:
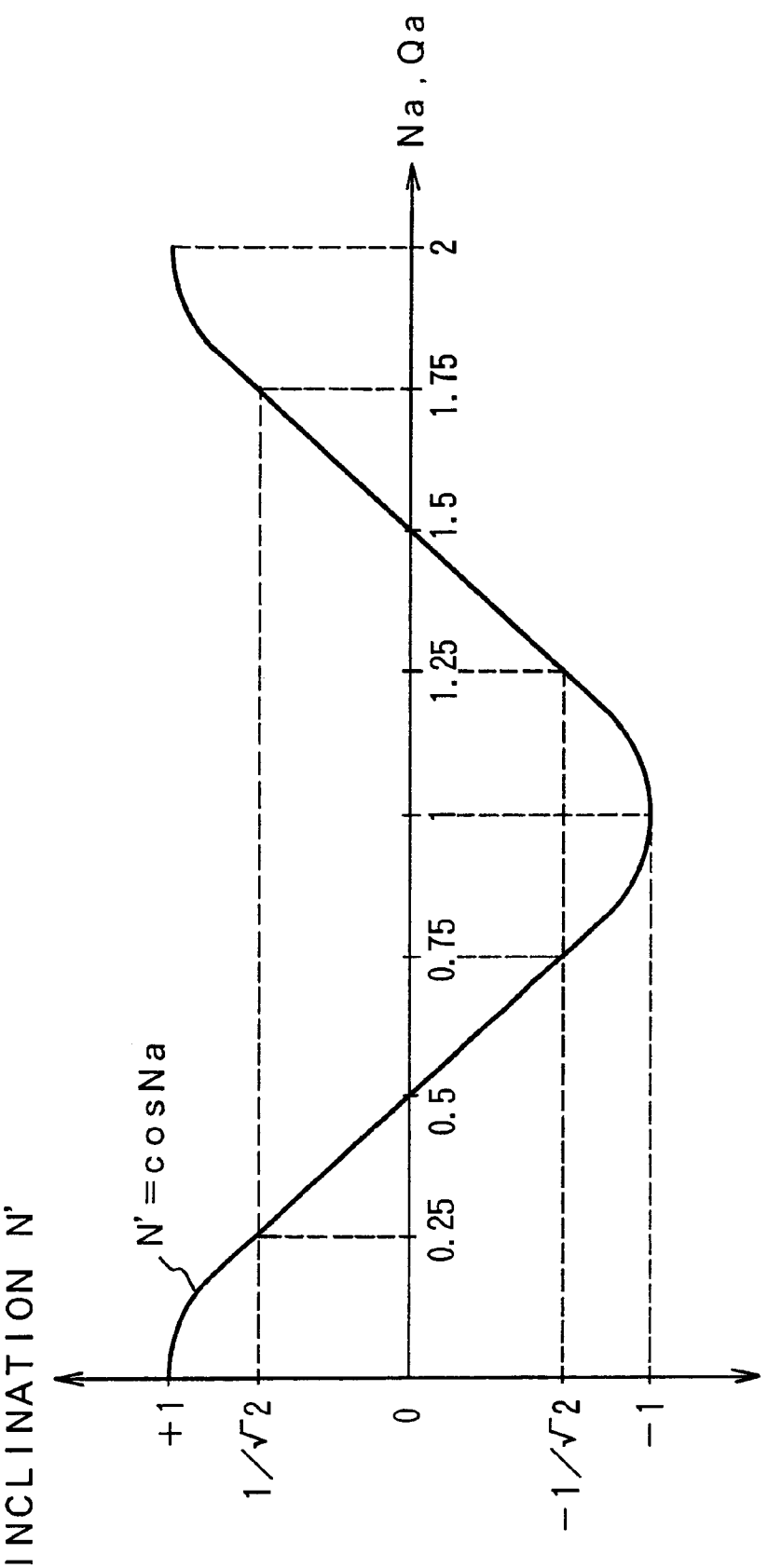
FIG. 15 is a characteristic diagram of differentiated FIG. 14 position signal N=sin Na.
Figure 16:
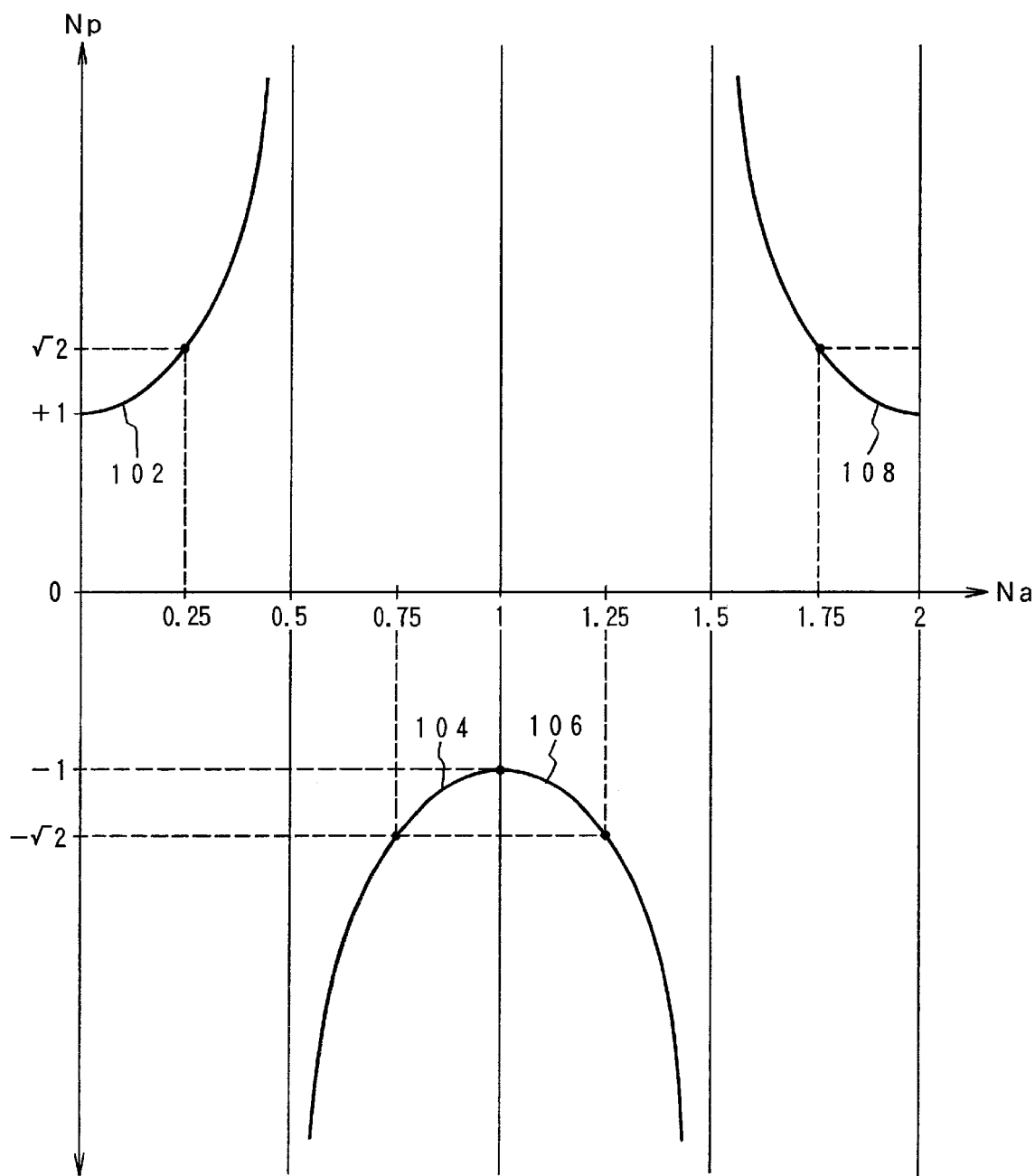
FIG. 16 is a characteristic diagram of a product coefficient $K_N$ which is the reciprocal of FIG. 15.

FIG. 15 shows the expression (11) differentiating the position signal N of FIG. 14. In FIG. 15, to correct the differentiated position signals N' to have a certain gain (1/√2) of the intersection of Na=0.25 within the range of 0.00<Na≦0.25, the reciprocal number (1/N') of the differentiated position signal N' is found, which is then multiplied by the position signal N of FIG. 14. In this respect, the same applies to the ranges 0.75 TP<Na≦1.00 TP 1.00 TP<Na≦1.25 TP 1.75 TP<Na≦2.00 TP FIG. 16 shows the characteristics of the product coefficient $K_N$ which is obtained as the reciprocal number of the inclination N' of FIG. 15, relative to the position signal N. The characteristic curve 100 of the memory table 86 of FIG. 9 stores the characteristic curve 102 within the range of 0.00<Na≦0.25 TP of the position signal in FIG. 16, this characteristic curve 102 being the same characteristic curve which, if vertically or horizontally inverted, will coincide with the characteristic curves 104, 106 and 108 within the range of 0.75 TP<N≦1.00 TP 1.00 TP<N≦1.25 TP 1.75 TP<N≦2.00 TP FIG. 17 shows the characteristic curve 102 of FIG. 16 normalized with the product coefficient $K_{N0}$=1 of the position signal N=0.25 TP, the normalized product coefficient $K_N$ resulting in the characteristic curve 10 of FIG. 8. As to the position signal Q of FIG. 14 as well, the product coefficient $K_Q$ for the position signal Q corresponding to the characteristic curve 100 of FIG. 9 can be obtained by finding the differentiated position signal Q' and thereafter finding the product coefficient $K_Q$ as its reciprocal number and finally normalizing it. Thus, the product coefficients $K_N$ and $K_Q$ derived from the relationship of FIG. 14 are given as $$K_N=1/(\sqrt{2}\cdot\cos N) \tag{13}$$

$$K_Q=1/(\sqrt{2}\cdot\cos Q) \tag{14}$$

Thus, substitution of the expressions (13) and (14) for the expressions (1) and (2) results in the relationships $$Na=K_N\cdot N=\{1/(\sqrt{2}\cdot\cos N)\cdot N \tag{15}$$

$$Qa=K_Q\cdot Q=\{1/(\sqrt{2}\cdot\cos Q)\cdot Q \tag{16}$$

It is preferred to determine by actual measurements the values of the normalized product coefficients $K_N$ and $K_Q$ for the position signals N and Q for use in the present invention shown in FIGS. 9 and 10. This actual measurements can include finding position signals N and Q relative to the actual track position X as in FIG. 12, differentiating it as in FIG. 15 from the relationship of FIG. 14 with the actual track position X=Na, Qa, finding the reciprocal as in FIG. 16 from the result of differentiation, and finally normalizing it as in FIG. 17. However, the actual track pitch is as extremely small as 1.1 μm, for example and hence it is virtually impossible to actually measure the position signals N and Q within the range less than 0.25 track pitch, e.g., on a 0.01 TP basis. Thus, the measurement may be achieved by utilizing the relationship indicated by the Bode diagram of the open loop gain G relative to the angular frequency ω in the position signal detection system as in FIG. 18. First, a straight line 110 represents the open loop gain G relative to the angular frequency ω when the head is positioned at the intersection of the position signals N and Q, with the zero-cross point gain 0 dB indicative of the position sensitivity of the intersection of the position signals N and Q. If the position sensitivity increases as a result of displacement of the head from this state, then the open loop gain G will shift toward the positive side as a straight line 112. On the contrary, a lowered position sensitivity will cause a shift of the open loop gain G toward the negative side as a line 114. By measuring the movement of the zero-cross point in the gain direction attendant on such a position sensitivity shifting by use of e.g., frequency spectrum analyzer, the measurement of the nonlinear position sensitivity is feasible. As in FIG. 12, this corresponds to the acquisition of the differentiated value N' of the position signal N. Thus, by finding the reciprocal of the measured gain and normalizing the reciprocal, it is possible to find the normalized product coefficients $K_N$ and $K_Q$ for the position signals N and Q as in FIGS. 9 and 10.

In the case of the frequency spectrum analyzer for measuring the amount of shift of the zero-cross in the gain direction of FIG. 18, it is possible to actually measure the gain, i.e., the position sensitivity as a result of occurrence of an inverted-U shaped variation with the zero-cross as its peak, since no frequency spectrum is obtained for the angular frequency ω less than the zero-cross due to the compression effect whilst no frequency spectrum is similarly obtained for the angular frequency ω exceeding the zero-cross due to the head incapable of mechanically moving.

In the above position sensitivity correction from nonlinear to linear, the position sensitivity is approximated by the sine function but instead it may be approximated by a cosine function. That is, in FIG. 12, approximation of the position signals N and Q relative to the actual track position X by the cosine function in place of the sine function shown results in $$N=\cos X \tag{17}$$

$$Q=\cos (X-0.5\ TP) \tag{18}$$

In this case, the position signals Na and Qa having the linear position sensitivity will become same as $$Na=X \tag{19}$$

$$Qa=X-0.5\ TP \tag{20}$$

which are obtained with the sine function. Thus, by representing the expressions (17) and (18) by the position signals Na and Qa having the linear position sensitivities of the expressions (19) and (20), relationships $$N=\cos Na \quad (21)$$

$$Q=\cos Qa \quad (22)$$

result.

In this case as well, to correct the position signals N and Q having the nonlinear position sensitivities into the position signals Na and Qa having the linear position sensitivities, $$Na=\cos^{-1} N \quad (23)$$

$$Qa=\cos^{-1} Q \quad (24)$$

can be effected.

Figure 19:
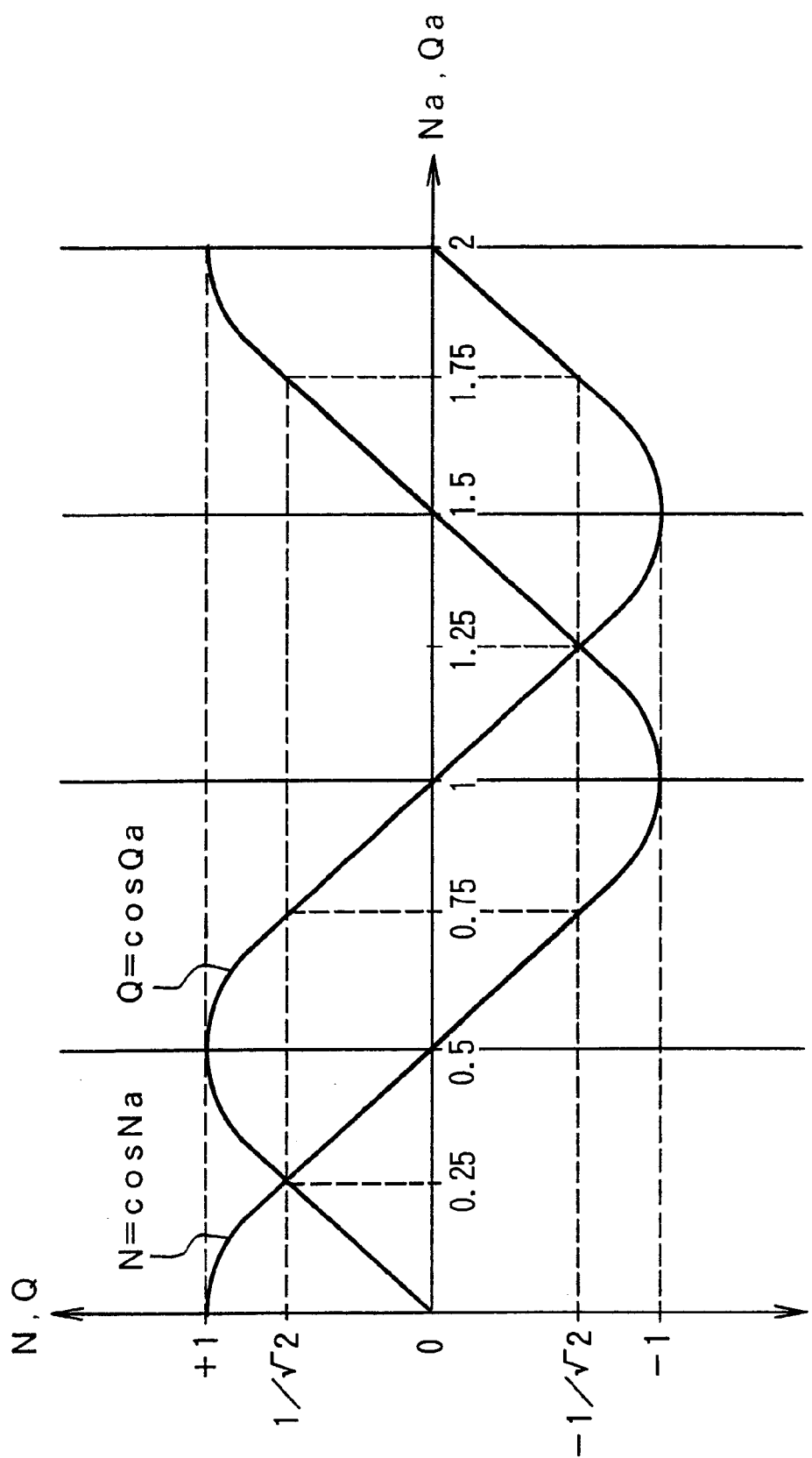
FIG. 19 is a characteristic diagram of the position signals having a nonlinear position sensitivity, relative to position signals Na, Qa having a linear position sensitivity approximated by a cosine function.

FIG. 19 shows the expressions (21) and (22) in which the inclination, i.e., gain determined by the values of the position signals N and Q having the nonlinear position sensitivities on the axis of ordinates relative to the position signals Na and Qa having the linear position sensitivities on the axis of abscissas are given by differentiating the expressions (21) and (22) as $$N'=(\cos Na)'=-\sin Na \quad (25)$$

$$G'=(\cos Qa)'=-\sin Qa \quad (26)$$

Figure 20:
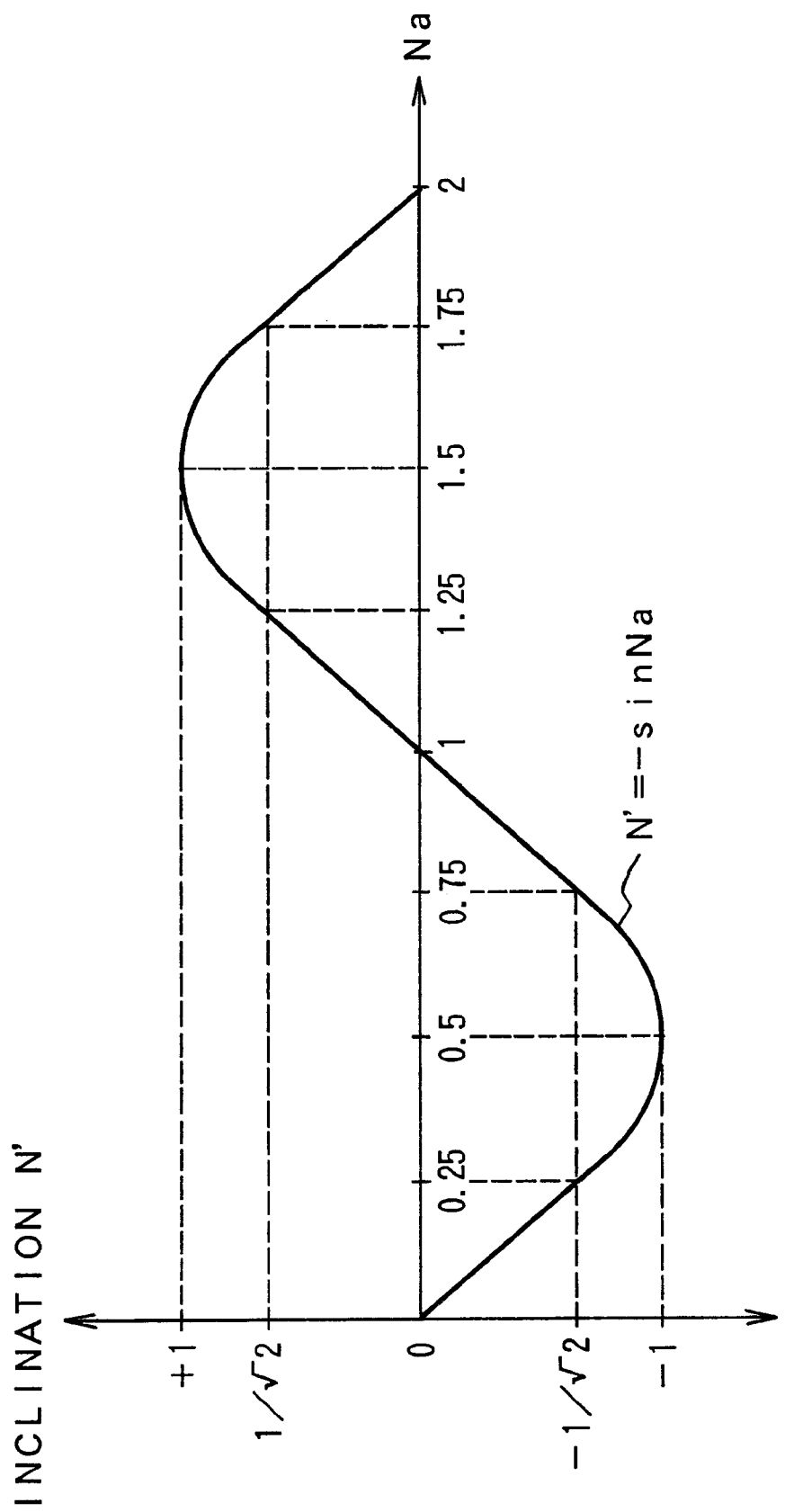
FIG. 20 is a characteristic diagram of differentiated FIG. 19 position signal N=cos Na.
Figure 21:
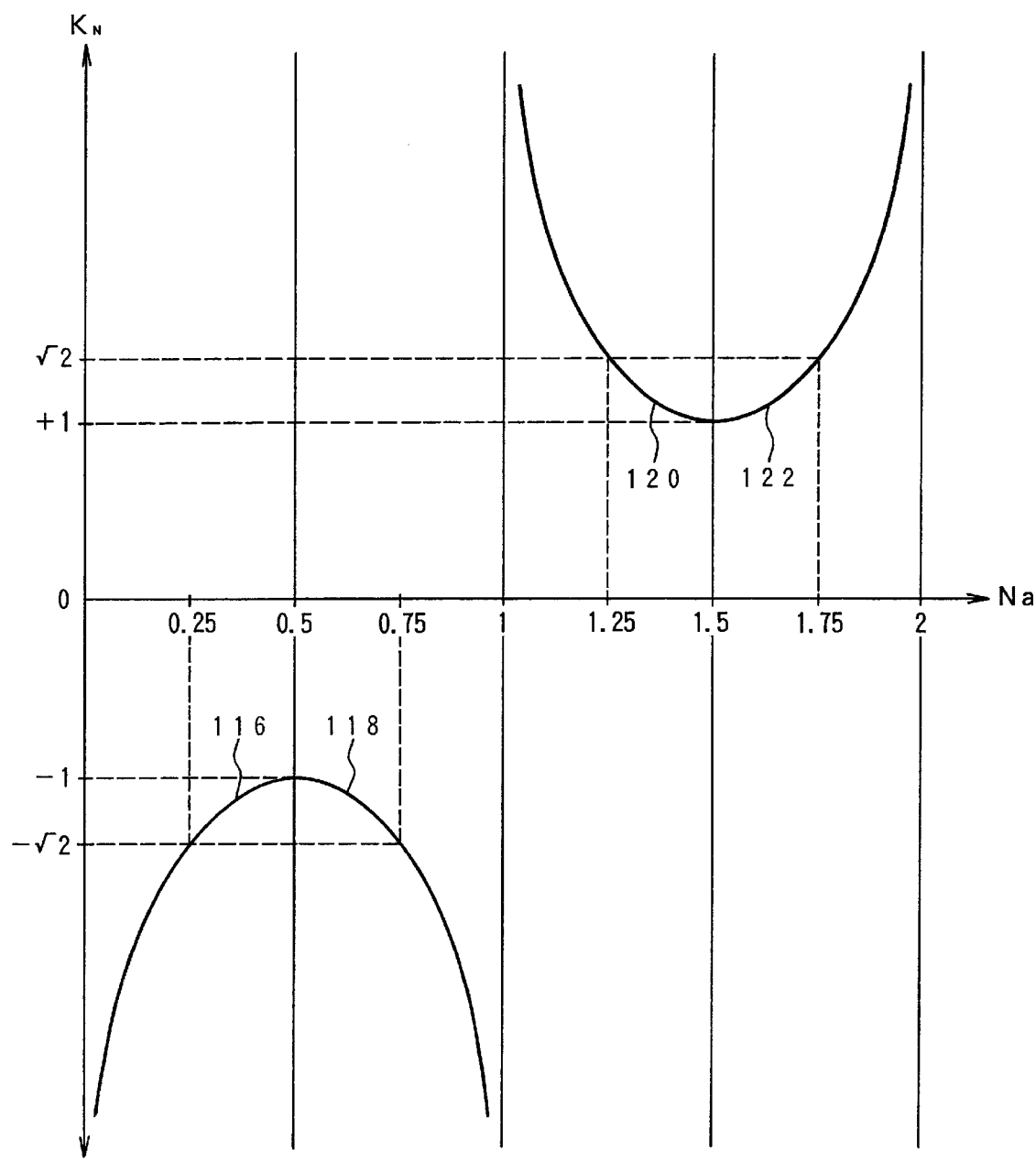
FIG. 21 is a characteristic diagram of a product coefficient $K_N$ which is the reciprocal of FIG. 20.
Figure 22:
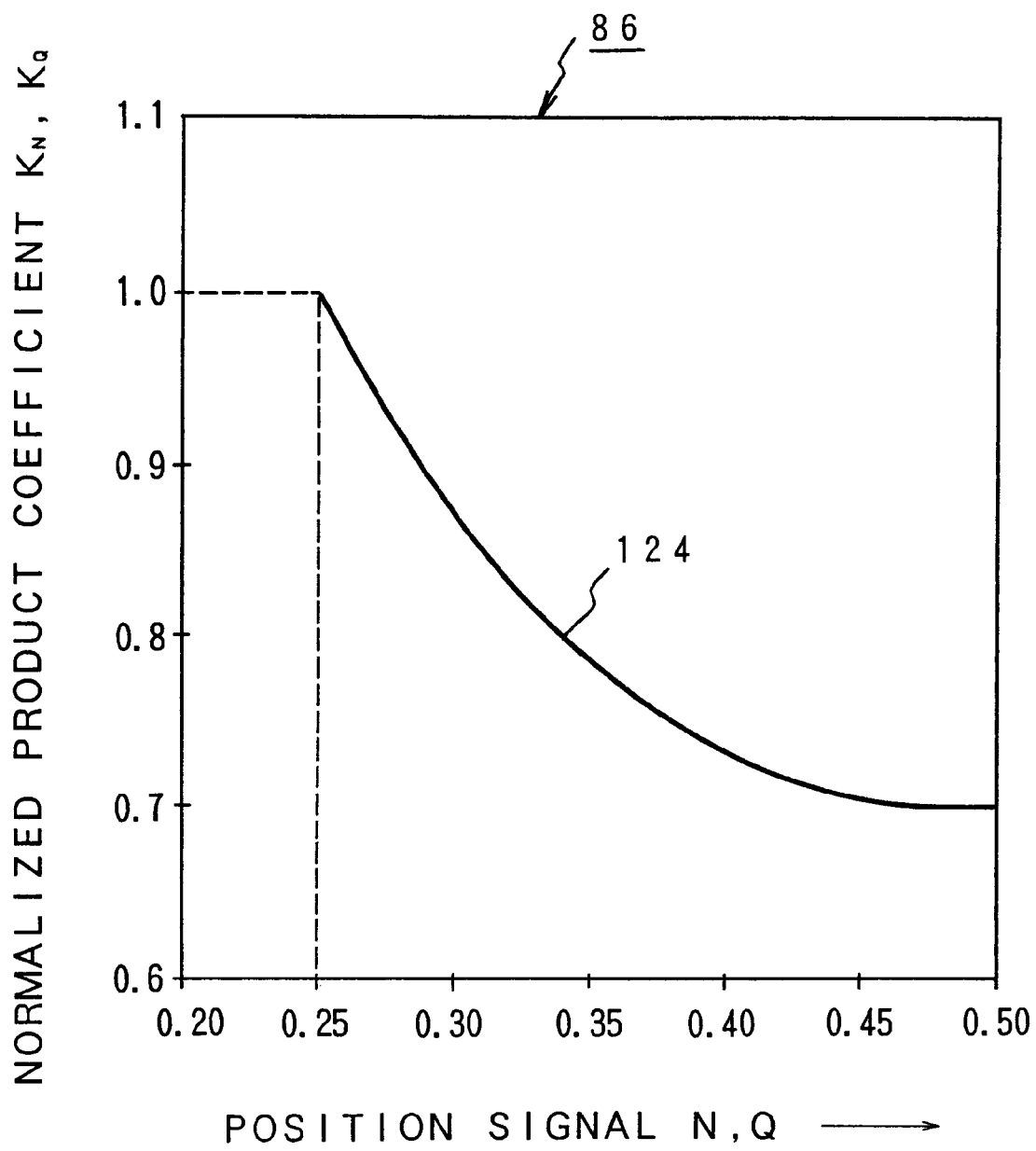
FIG. 22 is a characteristic diagram of the normalized product coefficient based on the cosine approximation, stored in the memory table of FIGS. 7 and 8.

FIG. 20 shows the differentiated position signal N' of the expression (26). Calculation of the reciprocal of the differentiated position signal N' of FIG. 20, i.e., of the inclination of N relative to the position signal Na of FIG. 19 results in FIG. 21. Then the absolute values of the characteristic curve 116 within the range of 0<N≦0.25 TP in FIG. 21 are found for normalization so that a characteristic curve 124 can be obtained of the normalized product coefficients $K_N$ and $K_Q$ for the position signals N and Q stored in the memory table 76 of FIG. 22. Naturally, the actual memory table 76 is stored in the form of table data as in FIG. 10 for example on the basis of the characteristic curve 124. The polarity table lookup values are as shown in FIG. 13A within the range below the position signals N and Q intersection level in the memory reading units 84 and 92 provided in the correction circuit 50 of FIGS. 7 and 8 in case of using the memory table 76 storing the characteristic curve 124 of FIG. 22. Although the characteristic curve 124 of the memory table 76 of FIG. 22 is created on the basis of the characteristic curve 116 of FIG. 21, for the purpose of equally applying this characteristic to the track ranges of the other characteristic curves 118, 120 and 122, use is made of respectively corresponding N signal table lookup values and Q signal table lookup values on the basis of the polarities of the position signals N and Q indicative of their respective track ranges.

In this case, the position signal Q has a phase lag of 0.5 TP relative to the position signal N, that is, $$N=Q+0.5\ TP$$

Hence, the Q signal table lookup values are acquired by substituting it for the N signal table lookup values of FIG. 23A. The Q signal table lookup values assume the values of FIG. 23B in effect. Thus, the product coefficients $K_N$ and $K_Q$ in the case of approximating the position sensitivity nonlinearity by the cosine function are given as $$K_N=-1/(\sqrt{2}\cdot\sin N) \quad (27)$$

$$K_Q=-1/(\sqrt{2}\cdot\sin Q) \quad (28)$$

Thus, by placing the expressions (27) and (28) in the expressions (1) and (2), relational expressions for correcting the position signals N and Q having the nonlinear position sensitivities into the position signals Na and Qa having the linear position sensitivities are given by $$Na=K_N\cdot N=-\{1/(\sqrt{2}\cdot\sin N)\cdot N \quad (29)$$

$$Qa=K_Q\cdot Q=-\{1/(\sqrt{2}\cdot\sin Q)\cdot Q \quad (30)$$

Although the above embodiment is directed to the case where the position sensitivity nonlinearity is approximated by the sine function or the cosine function by way of example, the approximation may otherwise be made by polynomial expressions. In the case of the approximation by the polynomial expressions, relative to the position signals Na and Qa, the position signals N and Q are approximated by $$N=A_N X^N+A_{N-1} X^{N-1}+\ldots+A_0$$

$$Q=A_N(X-0.5\ TP)^N+A_{N-1}(X-0.5\ TP)^{N-1}+\ldots+A_0$$

while simultaneously the linear functions of the two corrected position signals Na and Qa relative to the actual track positions are given as $$Na=X$$

$$Qa=X-0.5\ TP$$

whereby the relational expressions for the two $$N=A_N Na^N+A_{N-1}Na^{N-1}+\ldots A_0 \quad (31)$$

$$Q=A_N Qa^N+A_{N-1}Qa^{N-1}+\ldots A_0 \quad (32)$$

are obtained. The polynomial expressions for the actual use can be of the order of quadratic polynomial expressions to achieve a sufficient approximation. That is, the approximation is made by the quadratic polynomial expressions $$N=A_2 Na^2+A_1 Na+A_0 \quad (33)$$

$$Q=A_2 Qa^2+A_1 Qa+A_0 \quad (34)$$

Figure 24A:
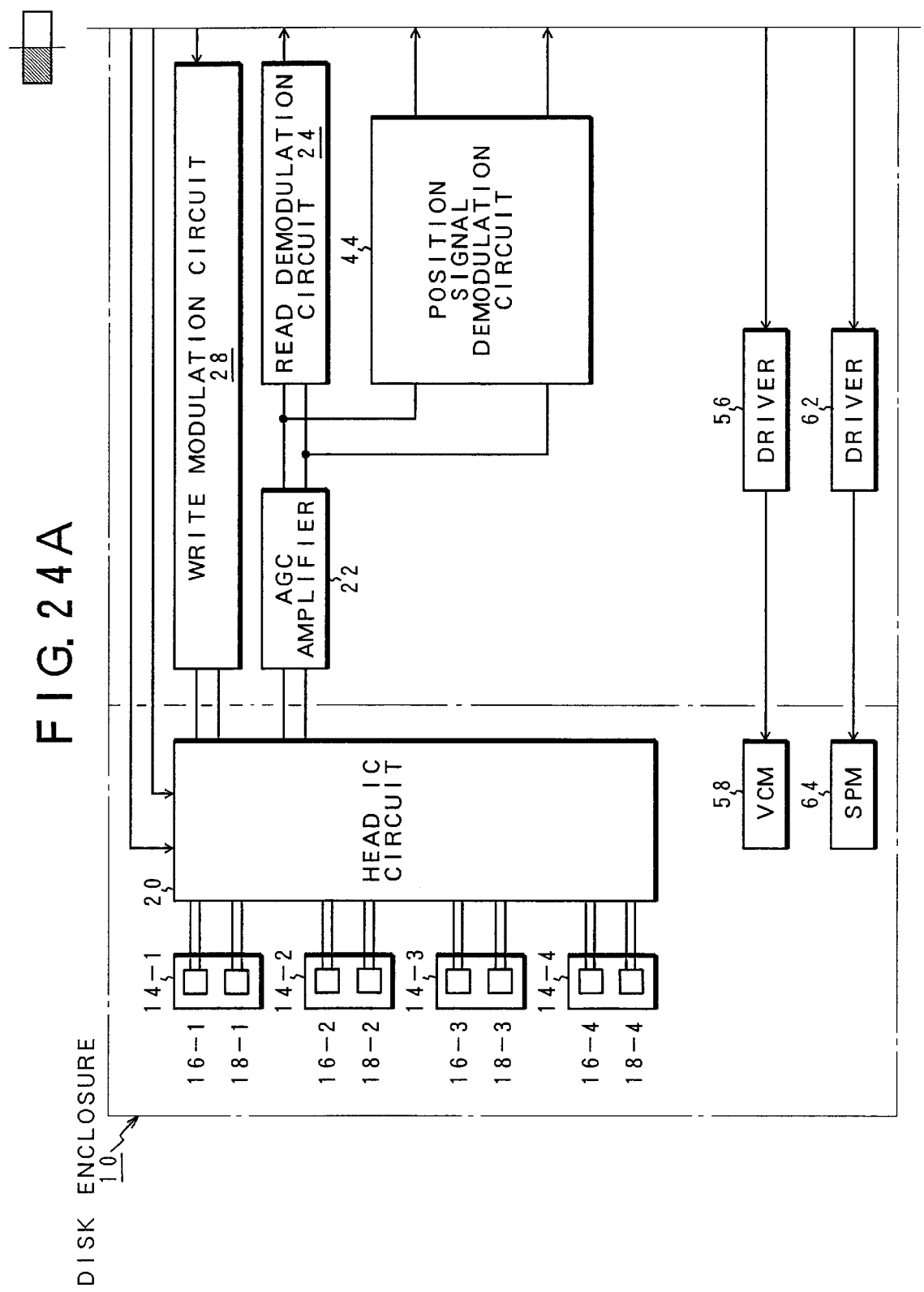
FIGS. 24A and 24B are block diagrams of another embodiment of the present invention in which the MPU is equipped with a position sensitivity adjustment function and a correction function.
Figure 24B:
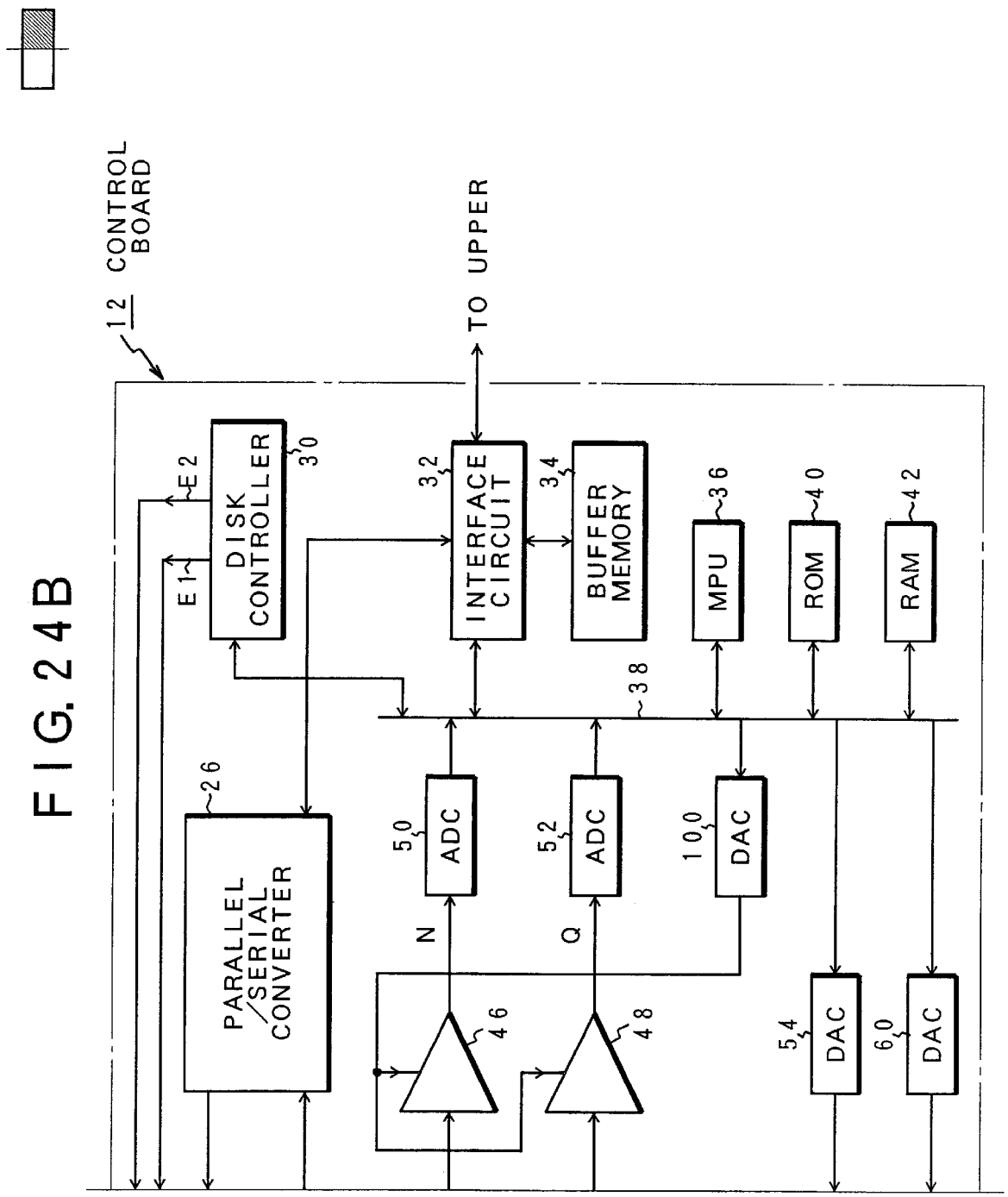

FIGS. 24A and 24B show another embodiment of the present invention, which is characterized in that the processings of the correction circuit 50 and the position sensitivity detection circuit 70 provided in the embodiment of FIGS. 3A and 3B are effected by the program control of the MPU 36. For this reason, there is no need for the correction circuit 50 and the position sensitivity detection circuit 70 as the hardware of the control board 12, but instead the bus 38 is associated with A/D converters 126 and 128 which convert the position signals N and Q from the AGC amplifiers 46 and 48 into digital data. The position sensitivity adjustment function provided in the MPU 36 is implemented by the program control of the circuit function of the position sensitivity detection circuit 70 of FIG. 3. More specifically, the A/D converters 126 and 128 read the position signals N and Q output from the AGC amplifiers 46 and 48 upon the apparatus delivery, upon the start-up, or at the calibration timing by the timer, etc. Then the intersection levels of the respective absolute values are detected to find the average value for the storage in the RAM 42. Then the gains of the AGC amplifiers 46 and 48 are set by the D/A converter 100 so that the detected intersection levels are kept at a certain level (theoretical value). Thus, the position signals N and Q output from the AGC amplifiers 46 and 48 are constantly kept at a certain level (theoretical value). For the position signals N and Q whose position sensitivities have been corrected on the basis of the detection of the intersection level of the position signals N and Q, by use of the same correction function as shown in the correction circuit 50 of FIG. 7 the MPU 36 corrects the position signals N and Q having the nonlinear position sensitivities read by the A/D converters 126 and 128, into the position signals Na and Qa having the linear position sensitivities. For the position sensitivity correction in this case as well, in the event of approximation of the position sensitivity nonlinearity by the sine functions for example, reference is made to the table information prepared in the RAM 42 for example and storing the contents of the characteristic curve 100 of FIG. 9, to thereby determine the normalized product coefficients $K'_N$ and $K_Q$, which are multiplied by the read position signals N and Q to obtain the position signals Na and Qa corrected to have linear position sensitivities.

Figure 25:
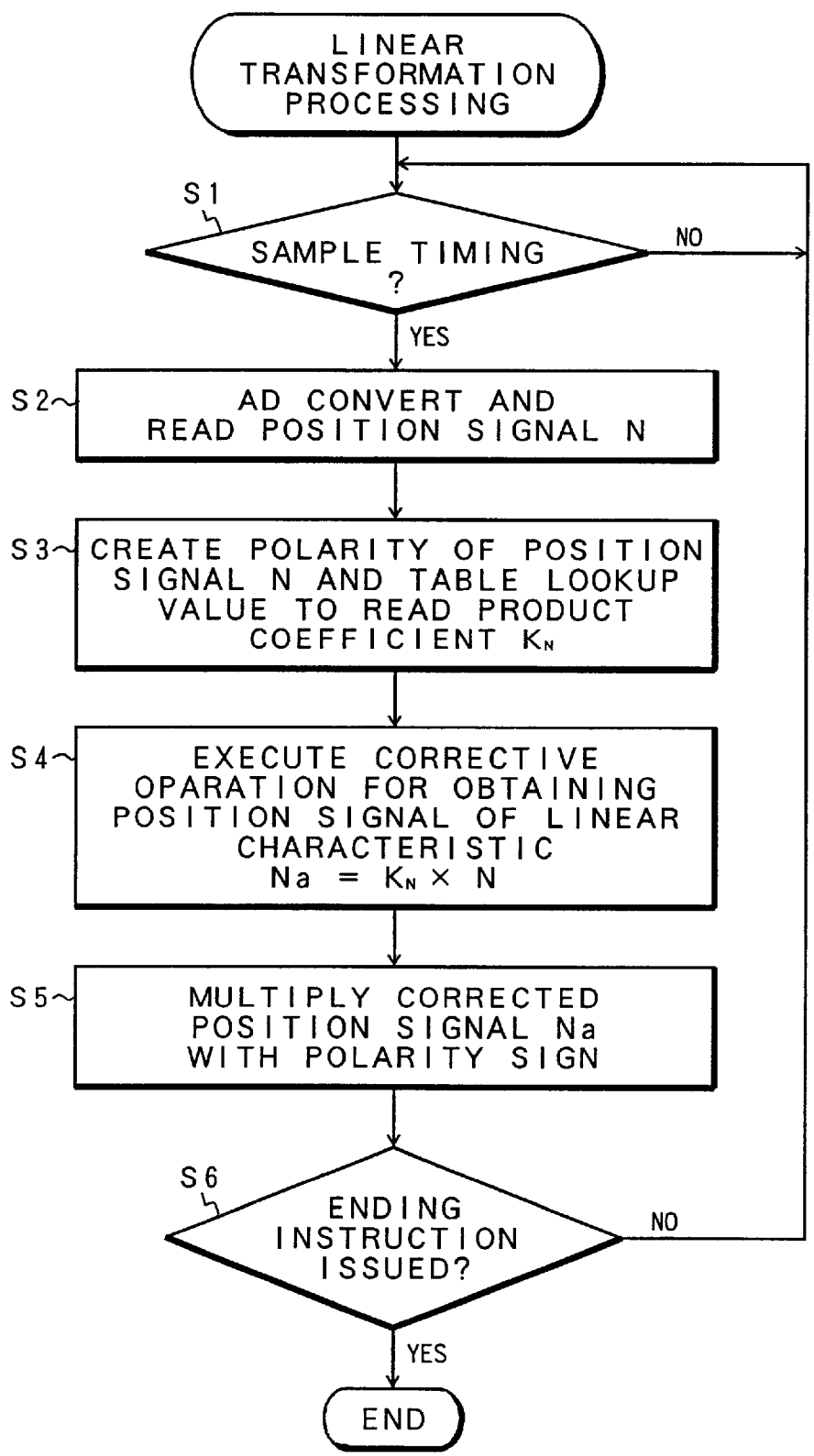
FIG. 25 is a flowchart of linear transform processing of a position signal N effected by the MPU of FIGS. 24A and 24B.

FIG. 25 is a flowchart of the position sensitivity linearity conversion processing of the position signal N. The sampling timing is checked in step S1 so that the position signal N data are read from the A/D converter 126 when the sampling timing is reached. Then in step S3 the polarities and the table lookup values of the position signal N at that time are created from the correlations of FIG. 11 to read the product coefficient $K_N$. Then in step S4, the thus read product coefficient $K_N$ is multiplied by the position signal N at that time to thereby acquire the position signal Na whose position sensitivity has been corrected into linear. Then in step S5, the corrected position signal Na is multiplied by the polarity sign judged in step S3 to allow the control processing to be performed by use of the position signals. Such processings are iterated till the receipt of the ending instruction in step S6.

Figure 26:
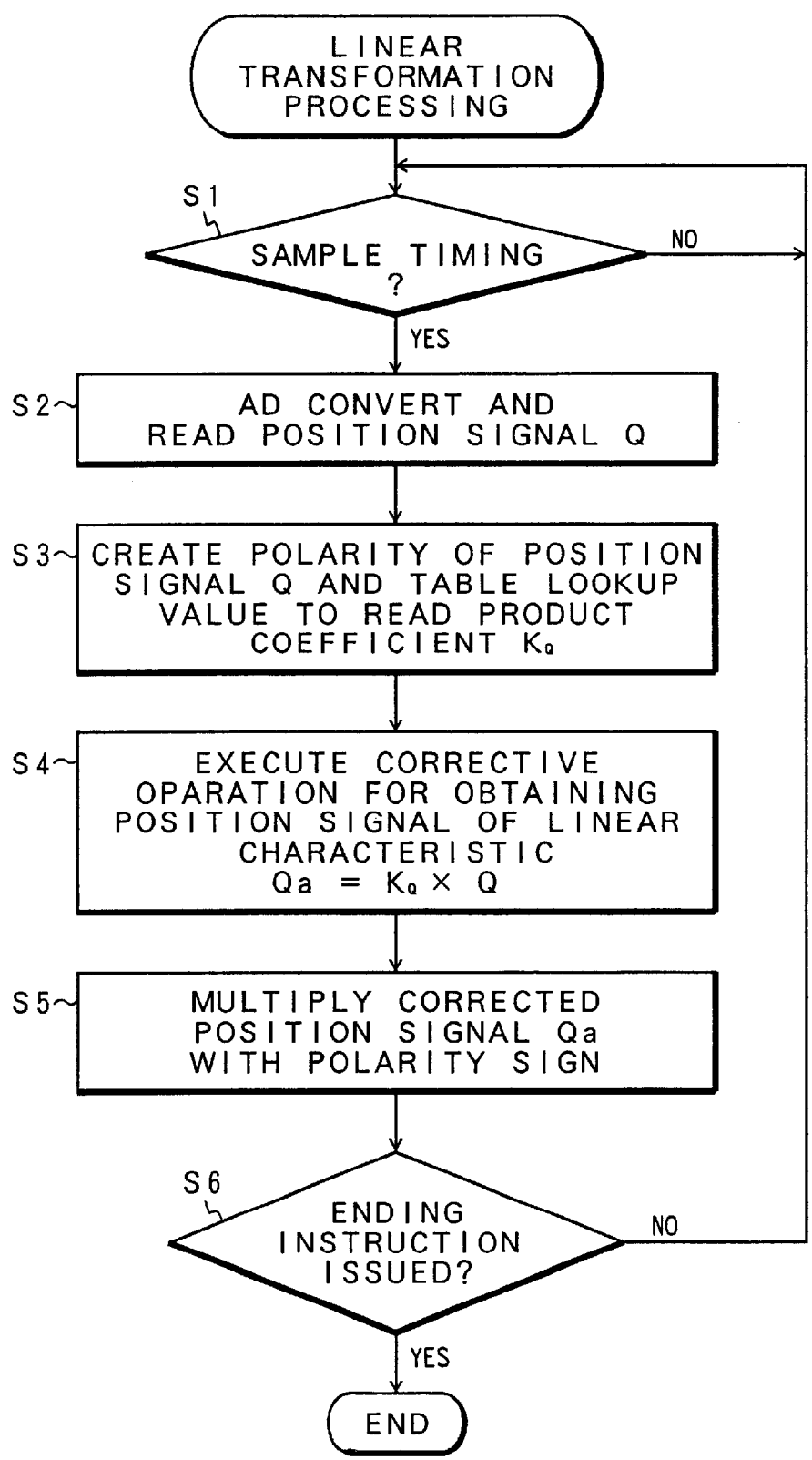
FIG. 26 is a flowchart of the linear transform processing of a position signal Q effected by the MPU of FIGS. 24A and 24B.

FIG. 26 is a flowchart for correcting by the MPU 36 the position signal Q into a position signal having the linear position sensitivity. In this case as well, the sampling timing is judged in step S1 and the position signal Q is converted into digital data by the A/D converter for reading in step S2. Then in step S3 the polarity of the position signal at that time and the table lookup values are created from the information of FIG. 11 so that the corresponding product coefficient $K_Q$ is read by reference to the table. Then in step S4, the position signal Q at that time is multiplied by the read product coefficient $K_Q$ to find the position signal Qa whose position sensitivity is linear. Then in step S5 it is multiplied by the polarity sign determined in the step S3 to provide output for the position signal based control. Such processing of steps S1 to S5 are iterated till the receipt of the ending instruction in step S6.

Although in the embodiment of FIG. 24 the MPU 36 effects the position sensitivity adjustment processing and the position sensitivity correction processing, the MPU may be replaced by a digital signal processor (DSP). Although the above embodiment is directed to the case by way of example where the sine functions, cosine functions or polynomial expressions are used to approximate the position sensitivity nonlinear characteristics of the position signals N and Q which have been demodulated from the two-phase information, it is also natural to make the approximation by use of any other appropriate functions.

Although the above embodiment is directed to the case of the phase Ø=TP/2 of the position signals N and Q by way of example, the phase Ø=TP/3 may be employed. In such an event, for the medium pattern recording of FIG. 6, the patterns A and B are recorded having sufficiently higher frequencies than the data recording frequencies, with ⅓ cylinder width on both sides of the cylinder boundaries of the cylinders n, n+1, N+2, etc. The patterns C and D are shifted by ⅓ cylinder relative to the patterns A and B so that the recording is made within the range of ⅓ cylinder width on both sides of the cylinder centers of the cylinders n, n+1, n+2. The phase Ø=TP/4, TP/5, etc., may be employed.

The present invention is not limited to the above embodiments but covers any appropriate variants without impairing the objects and advantages thereof. The present invention is not restricted by the numerical values of the above embodiments.

INDUSTRIAL APPLICABILITY

According to the present invention, as set forth hereinabove, the two-phase position signal having a nonlinear position sensitivity under the influence of leakage flux is first subjected to a position sensitivity correction at one point based on the intersection detection and then to a position sensitivity correction from nonlinear to linear within the position signal range below the intersection level. Thus, the position sensitivity can precisely be adjusted to a certain value with a high-precision within the track range which results in the positions of intersection of the position signals N and Q around the track center, whereby it is possible to realize the precise positioning control irrespective of the increased track densities (TPI) arising from demand for the increased capacity and reduced dimensions.

What is claimed is:

1. A storage apparatus comprising:

a position sensitivity adjusting unit which detects the signal level at the intersection of position signals N and Q having different phases φ by a predetermined track pitch (TP/n) which are demodulated from read signals of two-phase servo information buried and recorded in a disk medium, said position sensitivity adjusting unit making an adjustment of the gain of an AGC amplifier so that said intersection signal level coincides with a predetermined level; and a sensitivity correcting unit which corrects nonlinear position sensitivities relative to the actual track position X of two position signals N and Q output from said AGC amplifier, into linear position sensitivities, wherein said sensitivity correcting unit approximates two position signals N and Q relative to the actual track position X output from said AGC amplifier by cosine functions $N = \cos X$ $Q = \cos (X - TP/n)$ said sensitivity correcting unit defining linear functions of two position signals Na and Qa which are corrected relative to the actual track position X, as $Na = X$ $Qa = X - TP/n$ to thereby obtain relational expressions of the two $N = \cos Na$ $Q = \cos Qa$ said sensitivity correcting unit figuring out said corrected position signals Na and Qa from said relational expressions as $Na = \cos^{-1} N$ $Qa = \cos^{-1} Q$ to thereby correct nonlinear position sensitivities into linear ones.

2. A storage apparatus according to claim 1, wherein said sensitivity correcting unit previously prepares, in the form of table information, values of product coefficients $K_N = 1/(2 \sin N)$ for use in calculations of said corrected position signals Na and Qa, said sensitivity correcting unit determining said product coefficients $K_N$ and $K_Q$ by reference to said table information by position signals N and Q from said AGC amplifier, said sensitivity correcting unit multiplying said position signals N and Q by said thus determined product coefficients $K_N$ and $K_Q$ to thereby correct nonlinear position sensitivities into linear position sensitivities.

3. A storage apparatus according to claim 2, wherein depending on polarities of the two, said sensitivity correcting unit converts said position signals N and Q into (+, +); +(TP/n–,N), +{TP/n–(Q+TP/n)}

(–, +); –(TP/n+N), +{TP/n+(Q+TP/n)}

(–, –); –(3 TP/n–N), –{3 TP/n–(Q+TP/n)}

(+, –); +(3 TP/n+N), –{3 TP/n+(Q+TP/n)} previous to reference to said table information.

4. A storage apparatus according to claim 1, wherein said sensitivity correcting unit approximates two position signals N and Q relative to the actual track position X output from said AGC amplifier by polynomial expressions $N=A_N X^N+A_{N-1} X^{N-1}+ \ldots +A_0$ $Q=A_N(X-TP/n)^N+A_{N-1}(X-TP/n)^{N-1}+ \ldots +A_0$ said sensitivity correcting unit defining linear functions of two position signals Na and Qa which are corrected relative to the actual track position, as Na=X Qa=X–TP/n to thereby obtain relational expressions of the two $N=A_N Na^N+A_{N-1} Na^{N-1}+ \ldots +A_0$ $Q=A_N Qa^N+A_{N-1} Qa^{N-1}+ \ldots +A_0$ to thereby correct nonlinear position sensitivities into linear ones.

5. A storage apparatus according to claim 1, wherein said sensitivity correcting unit figures out said corrected position signals Na and Qa from $Na=-\{1/\sqrt{2}\cdot \sin N)\}\cdot N$ $Qa=-\{1/\sqrt{2}\cdot \sin Q)\}\cdot Q$ 6. A storage apparatus comprising:

a position sensitivity adjusting unit which detects the signal level at the intersection of position signals N and Q having different phases Ø by a predetermined track pitch (TP/n) which are demodulated from read signals of two-phase servo information buried and recorded in a disk medium, said position sensitivity adjusting unit making an adjustment of the gain of an AGC amplifier so that said intersection signal level coincides with a predetermined level;

a sensitivity correcting unit which corrects nonlinear position sensitivities relative to the actual track position X of two position signals N and Q output from said AGC amplifier, into linear position sensitivities; and wherein said sensitivity correcting unit approximates two position signals N and Q relative to the actual track position X output from said AGC amplifier by sine functions N=sin X Q=sin (X–TP/n)

said sensitivity correcting unit defining linear functions of two position signals Na and Qa which are corrected relative to the actual track position X, as Na=X Qa=X–TP/n to thereby obtain relational expressions of the two N=sin Na Q=sin Qa said sensitivity correcting unit figuring out from said relational expressions said corrected position signals Na and Qa as Na=sin$^{-1}$ N Qa=sin$^{-1}$ Q to thereby correct nonlinear position sensitivities into linear ones.

7. A storage apparatus according to claim 6, wherein said sensitivity correcting unit figures out said corrected position signals Na and Qa from $Na=\{1/(\sqrt{2}\cdot \cos N)\}\cdot N$ $Qa=\{1/(\sqrt{2}\cdot \cos Q)\}\cdot Q$.

8. A storage apparatus according to claim 7, wherein said sensitivity correcting unit previously prepares, in the form of table information, values of product coefficients $K_N=1/(\sqrt{2}\cdot \cos N)$ for use in calculations of said corrected position signals Na and Qa, said sensitivity correcting unit circuit determining said product coefficients $K_N$ and $K_Q$ by reference to said table information by position signals N and Q from said AGC amplifier, said sensitivity correcting unit multiplying said position signals N and Q by said thus determined product coefficients $K_N$ and $K_Q$ to thereby correct nonlinear position sensitivities into linear position sensitivities.

9. A storage apparatus according to claim 8, wherein depending on the polarities of the two, said sensitivity correcting unit converts said position signals N and Q into (+, –); +N, +(Q+TP/n)

(+, +); +(2 TP/n–N), +{1–(Q+TP/n)}

(–, +); –(2 TP/n+N), +{1+(Q+TP/n)}

(–, –); –(4 TP/n–N), –{4 TP/n–(Q+TP/n)} previous to reference to said table information.

* * * * *